(12) United States Patent
Xin et al.

(10) Patent No.: US 10,880,781 B2
(45) Date of Patent: *Dec. 29, 2020

(54) SERVICE COMMUNICATION METHOD AND DEVICE

(71) Applicant: HUAWEI TECHNOLOGIES CO., LTD., Shenzhen (CN)

(72) Inventors: Yang Xin, Shanghai (CN); Weiwei Chong, Shanghai (CN); Xiaobo Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/388,856

(22) Filed: Apr. 18, 2019

(65) Prior Publication Data

US 2019/0253931 A1 Aug. 15, 2019

Related U.S. Application Data

(63) Continuation of application No. PCT/CN2016/109725, filed on Dec. 13, 2016.

(51) Int. Cl.
*H04W 28/18* (2009.01)
*H04W 24/02* (2009.01)
(Continued)

(52) U.S. Cl.
CPC ........... *H04W 28/18* (2013.01); *H04W 24/02* (2013.01); *H04W 24/10* (2013.01);
(Continued)

(58) Field of Classification Search
None
See application file for complete search history.

(56) References Cited

U.S. PATENT DOCUMENTS 7,957,348 B1 * 6/2011 Gallagher ............. H04W 76/22
370/331
2004/0047437 A1 3/2004 Hamiti et al.
(Continued)

FOREIGN PATENT DOCUMENTS

CN 1893304 A 1/2007
CN 101018168 A 8/2007
(Continued)

OTHER PUBLICATIONS

Huawei,"Discussion for enhanced VoLTE Performance",TSGS2-117-Kaohsiung-City:S2-165634,Oct. 11, 2016,total 6 pages.
(Continued)

*Primary Examiner* — Anh Vu H Ly
(74) *Attorney, Agent, or Firm* — Hauptman Ham, LLP

(57) ABSTRACT

Embodiments relate to the field of communications technologies, and provide a service communication method and a device, to resolve a problem that a service cannot be normally executed because a radio resource is forcibly allocated to UE after a service establishment request is received. In this method, a service establishment request sent by a service application server can be received by an access network device. A notification message to the service application server can be sent by the access network device. The notification message can carry information reflecting an actual network status of a cell in which UE is located, and the actual network status of the cell in which the UE is located is used by the service application server to determine updated radio channel quality requirement information. This method can be performed in a process of establishing a service and performing service communication.

16 Claims, 16 Drawing Sheets

(51) Int. Cl.
*H04W 28/02* (2009.01)
*H04W 24/10* (2009.01)
*H04W 88/08* (2009.01)
*H04W 88/18* (2009.01)

(52) U.S. Cl.
CPC ........ *H04W 28/0236* (2013.01); *H04W 88/08* (2013.01); *H04W 88/18* (2013.01)

(56) References Cited

U.S. PATENT DOCUMENTS

| | | | | |
|---|---|---|---|---|
| 2008/0247326 | A1* | 10/2008 | Cormier | H04W 12/0027 370/252 |
| 2008/0259865 | A1* | 10/2008 | Hurtta | H04L 47/822 370/329 |
| 2013/0190032 | A1* | 7/2013 | Li | H04L 67/26 455/517 |
| 2015/0156807 | A1* | 6/2015 | Guo | H04W 76/14 370/329 |
| 2015/0229677 | A1* | 8/2015 | Gu | H04L 65/103 709/219 |
| 2015/0264616 | A1* | 9/2015 | Chen | H04W 36/38 370/331 |
| 2016/0119384 | A1 | 4/2016 | Karimli et al. | |
| 2017/0208506 | A1* | 7/2017 | Wang | H04W 28/24 |
| 2017/0325146 | A1* | 11/2017 | Breuer | H04W 36/30 |
| 2017/0332282 | A1* | 11/2017 | Dao | H04W 72/087 |
| 2019/0124563 | A1* | 4/2019 | Zhang | H04W 36/0069 |
| 2019/0141169 | A1* | 5/2019 | Ni | H04L 69/24 |
| 2019/0191351 | A1* | 6/2019 | Chong | H04W 72/087 |
| 2019/0191352 | A1* | 6/2019 | Chong | H04W 36/08 |
| 2019/0222439 | A1* | 7/2019 | Zhu | H04L 69/08 |
| 2020/0015113 | A1* | 1/2020 | Xin | H04L 41/5003 |

FOREIGN PATENT DOCUMENTS

| | | |
|---|---|---|
| CN | 101242568 A | 8/2008 |
| CN | 101577975 A | 11/2009 |
| CN | 102104929 A | 6/2011 |
| CN | 102186214 A | 9/2011 |
| CN | 102571409 A | 7/2012 |
| CN | 102833683 A | 12/2012 |
| CN | 103297942 A | 9/2013 |
| CN | 103533342 A | 1/2014 |
| CN | 103781182 A | 5/2014 |
| CN | 103974290 A | 8/2014 |
| CN | 105682014 A | 6/2016 |
| CN | 105992276 A | 10/2016 |
| EP | 3026950 A2 | 6/2016 |
| EP | 2351309 A1 | 8/2017 |
| KR | 20140028708 A | 3/2014 |
| WO | 2010037428 A1 | 4/2010 |

OTHER PUBLICATIONS

Chinese Third Office Action issued in corresponding Chinese Application No. 201680088520.X, dated Aug. 28, 2020, The State Intellectual Property Office of People's Republic of China, Beijing, China.

* cited by examiner

# SERVICE COMMUNICATION METHOD AND DEVICE

CROSS-REFERENCE TO RELATED APPLICATIONS

This disclosure is a continuation of International Application No. PCT/CN2016/109725, filed on Dec. 13, 2016, which claims priority to International Application No. PCT/CN2016/102476, filed on Oct. 18, 2016. The disclosure of the aforementioned applications are hereby incorporated by reference in their entireties.

TECHNICAL FIELD

The present disclosure relates to the field of communications technologies, and in particular, to a service communication method and a device.

BACKGROUND

A voice service in a Long Term Evolution (LTE) network is referred to as a voice over Long Term Evolution VoLTE) service. Currently, a growing quantity of operators start commercial use of VoLTE, and more user equipments (UE) can support the VoLTE service.

In the prior art, after receiving a service establishment request of a VoLTE service, an eNB directly allocates a radio resource to the VoLTE service. However, when the UE is located in a weak coverage area of the LTE network, the VoLTE service cannot be normally executed or user experience brought by executing the VoLTE service is relatively poor.

SUMMARY

Embodiments of this disclosure provide a service communication method and a device, to resolve the following problem: Because a radio resource is forcibly allocated to UE after a service establishment request is received, a service cannot be normally executed or user experience brought by executing a service is relatively poor.

According to a first aspect, a service communication method is provided, including: receiving, by an access network device, a service establishment request sent by a core network device or a service application server, where the service establishment request carries radio channel quality requirement information of a service, and the radio channel quality requirement information of the service is used to indicate, to the access network device or the core network device, a radio channel quality requirement for executing the service by UE; and sending, by the access network device, a notification message to the core network device or the service application server, where the notification message carries information reflecting an actual network status of a cell in which the UE is located, and the actual network status of the cell in which the UE is located is used by the service application server to determine updated radio channel quality requirement information.

After receiving the service establishment request sent by the service application server, the access network device may send the notification message to the service application server. In addition, the notification message carries the information reflecting the actual network status of the cell in which the UE is located, and the information reflecting the actual network status of the cell in which the UE is located can actually reflect a current network environment status of the UE and a radio resource use status. Therefore, the service application server can adjust the radio channel quality requirement information of the service based on the information carried in the notification message, to determine the updated radio channel quality requirement information. In this solution, the access network device may send the notification message to the service application server, so that the service application server can adjust the radio channel quality requirement information of the service in a timely manner based on the notification message, to ensure that the service is normally executed and improve user experience brought by executing the service.

In a possible implementation, the information that is carried in the notification message and that reflects the actual network status of the cell in which the UE is located includes at least one of: radio channel quality of the cell in which the UE is located, terminal type information of the UE, carrier information of the cell in which the UE is located, location information of the UE, load information of the cell in which the UE is located, radio access technology (RAT) information of a network of the cell in which the UE is located, recommended-codec information, and bandwidth information of the service.

In a possible implementation, a method in which the access network device receives the service establishment request sent by the service application server may include: receiving, by the access network device by using the core network device, the service establishment request sent by the service application server; or receiving, by the access network device through an interface between the service application server and the access network device, the service establishment request sent by the service application server. The interface between the service application server and the access network device may be a private interface that is provided by a device vendor and that is between the service application server and the access network device.

In a possible implementation, a method in which the access network device sends the notification message to the service application server may include: sending, by the access network device, the notification message to the service application server by using the core network device; or sending, by the access network device, the notification message to the service application server through the interface between the service application server and the access network device.

In a possible implementation, the radio channel quality requirement information includes at least one of: service type indication information of the service, codec information of the service, a codec information list of the UE, and the terminal type information of the UE, and the codec information list of the UE includes codec information supported by both the UE and the service application server. The access network device may determine, based on the radio channel quality requirement information of the service, whether the radio channel quality of the cell in which the UE is located meets the radio channel quality requirement corresponding to the radio channel quality requirement information of the service, and send the notification message to the service application server when the radio channel quality of the cell in which the UE is located does not meet the radio channel quality requirement corresponding to the radio channel quality requirement information of the service. Certainly, after receiving the service establishment request, the access network device may send the notification message to the service application server regardless of whether the radio channel quality of the cell in which the UE is located meets the radio channel quality requirement corresponding to the radio channel quality requirement information of the service.

In a possible implementation, before sending the notification message to the service application server or the core network device, the access network device may obtain the radio channel quality that is of the cell in which the UE is located and that is carried in the notification message. A method in which the access network device obtains the radio channel quality of the cell in which the UE is located may specifically include: delivering, by the access network device, a measurement control command to the UE; and receiving, by the access network device, a measurement report sent by the UE, where the measurement report carries the radio channel quality of the cell in which the UE is located. Before sending the notification message to the service application server or the core network device, the access network device sends the measurement control command to the UE, so that the UE measures, in real time, the radio channel quality of the cell in which the UE is located, and this can improve authenticity of the radio channel quality that is of the cell in which the UE is located and that is obtained by the access network device. Therefore, the service application server can determine the updated radio channel quality requirement information based on the relatively authentic radio channel quality, and this can improve authenticity of the determined updated radio channel quality requirement information.

In a possible implementation, because the information carried in the notification message is used to determine the updated radio channel quality requirement information, after receiving the notification message, the service application server may determine the updated radio channel quality requirement information based on the information carried in the notification message, and send the determined updated radio channel quality requirement information to the access network device. In this way, after the access network device sends the notification message to the core network device or the service application server, the service communication method may further include: receiving, by the access network device, a service modification request sent by the service application server, where the service modification request carries the updated radio channel quality requirement information. The updated radio channel quality requirement information includes at least one of: updated service type indication information of the service, updated codec information of the service, a codec information list of the UE, and the terminal type information of the UE. The codec information list of the UE includes codec information supported by both the UE and the service application server. In this solution, after determining the updated radio channel quality requirement information based on the information carried in the notification message, the service application server may send, to the access network device in a timely manner, the service modification request that carries the updated radio channel quality requirement information. To be specific, in this solution, the radio channel quality requirement information of the service can be adjusted in a timely manner, to ensure that after the service is created, the service can be normally executed and user experience brought by executing the service is improved.

In a possible implementation, after receiving a service deletion request sent by the service application server, the access network device may terminate a corresponding service. Specifically, after the access network device sends the notification message to the core network device or the service application server, the service communication method may further include: receiving, by the access network device, a service deletion request sent by the service application server; and terminating, by the access network device, the service after receiving the service deletion request. The service deletion request may carry an identifier of a to-be-deleted service. In this way, after receiving the service deletion request, the access network device may delete a corresponding service based on the identifier carried in the service deletion request. Certainly, the service deletion message may carry a specific cause value of terminating the service. For example, the radio channel quality of the cell in which the UE is located cannot meet the radio channel quality requirement corresponding to the radio channel quality information of the service. When terminating the service, the access network device may release a radio resource allocated to the service, so that the radio resource allocated to the service can serve another service, thereby improving radio resource utilization.

In a possible implementation, the location information of the UE includes at least one of: an identity of the cell in which the UE is located, an identity of a base station serving the UE, a tracking area identity (TAI) of the UE, a location area identity (LAI) of the UE, and a routing area identity (RAI) of the UE.

In a possible implementation, the radio channel quality requirement of the service includes at least one of: a reference signal received power (RSRP for) requirement, a reference signal received quality (RSRQ) requirement, and a signal to interference plus noise ratio (SINR) requirement.

In a possible implementation, the codec information of the service includes codec type information of the service and codec mode set information of the service.

In a possible implementation, the radio channel quality includes at least one of: RSRP, RSRQ, and an SINR.

In a possible implementation, the terminal type information of the UE includes at least one of: an international mobile equipment identity (IMEI) of the UE, a type approval code (TAC) of an IMEI, or an international mobile subscriber identity (IMSI) of the UE.

In a possible implementation, a manner in which the access network device sends the notification message to the service application server may be specifically transmitting the notification message by using an Internet Protocol (IP) data packet, a User Datagram Protocol (UDP) data packet, or a Real-Time Transport Protocol (RTP) data packet of the service.

In a possible implementation, the network of the cell in which the UE is located may be any one of a fifth generation mobile communication technology (5G) network, a fourth generation mobile communication technology (4G) network, a third generation mobile communication technology (3G) network, or a second generation mobile communication technology (2G) network.

According to a second aspect, a service communication method is provided, including: sending, by a service application server, a service establishment request to an access network device or a core network device, where the service establishment request carries radio channel quality requirement information of a service, and the radio channel quality requirement information of the service is used to indicate, to the access network device or the core network device, a radio channel quality requirement for executing the service by UE; and receiving, by the service application server, a notification message sent by the access network device or the core network, where the notification message carries information reflecting an actual network status of a cell in which the UE is located, and the actual network status of the cell in which the UE is located is used by the service application server to determine updated radio channel quality requirement information.

After sending the service establishment request to the access network device, the service application server may receive the notification message sent by the access network device. In addition, the notification message carries the information reflecting the actual network status of the cell in which the UE is located, and the information reflecting the actual network status of the cell in which the UE is located can actually reflect a current network environment status of the UE and a radio resource use status. Therefore, the service application server can adjust the radio channel quality requirement information of the service based on the information carried in the notification message, to determine the updated radio channel quality requirement information. In this solution, the access network device may send the notification message to the service application server, so that the service application server can adjust the radio channel quality requirement information of the service in a timely manner based on the notification message, to ensure that the service is normally executed and improve user experience brought by executing the service.

In a possible implementation, the information that is carried in the notification message and that reflects the actual network status of the cell in which the UE is located includes at least one of: terminal type information of the UE, carrier information of the cell in which the UE is located, location information of the UE, load information of the cell in which the UE is located, RAT information of a network of the cell in which the UE is located, recommended-codec information, and bandwidth information of the service.

In a possible implementation, a method in which the service application server sends the service establishment request to the access network device may include: sending, by the service application server, the service establishment request to the access network device by using the core network device; or sending, by the service application server, the service establishment request to the access network device through an interface between the service application server and the access network device. The interface between the service application server and the access network device may be a private interface that is provided by a device vendor and that is between the service application server and the access network device.

In a possible implementation, a method in which the service application server receives the notification message sent by the access network device may include: receiving, by the service application server by using the core network device, the notification message sent by the access network device; or receiving, by the service application server through the interface between the service application server and the access network device, the notification message sent by the access network device.

In a possible implementation, the radio channel quality requirement information includes at least one of: service type indication information of the service, codec information of the service, a codec information list of the UE, and the terminal type information of the UE, and the codec information list of the UE includes codec information supported by both the UE and the service application server.

In a possible implementation, the service application server may store a correspondence among the radio channel quality requirement information of the service, a mean opinion score (MOS) of the service, and at least one piece of the following information carried in the notification message: "radio channel quality of the cell in which the terminal is located, the terminal type information of the terminal, the carrier information of the cell in which the UE is located, the location information of the UE, the codec information of the service, the load information of the cell in which the terminal is located, the RAT information of the network in which the terminal is located, and the bandwidth information of the service". The correspondence is obtained by the service application server by collecting statistics about big data. In this way, after receiving the notification message sent by the access network device, the service application server may determine the updated radio channel quality requirement information based on the information carried in the notification message. Specifically, a method in which the service application server determines the updated radio channel quality requirement information based on the information carried in the received notification message may include: determining, by the service application server, the updated radio channel quality requirement information based on the MOS requirement of the service and at least one piece of the following information carried in the notification message: the radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which the UE is located, and the bandwidth information of the service.

In a possible implementation, when the service application server does not store the foregoing correspondence, a third-party network device that stores the foregoing correspondence may determine the updated radio channel quality requirement information. Specifically, the service communication method may further include: sending, by the service application server, a first query request to the third-party network device, where the first query request carries an MOS requirement of the service and at least one of: radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which the UE is located, and the bandwidth information of the service; and receiving, by the service application server, a first query response sent by the third-party network device, where the first query response carries the updated radio channel quality requirement information. It should be noted that, for a specific method in which the service application server or the third-party network device determines the updated radio channel quality requirement information based on the MOS requirement of the service and the information carried in the notification message, refer to a related prior-art method for determining radio channel quality requirement information of a service. Details are not described herein again.

In a possible implementation, instead of waiting to receive the notification message sent by the access network device, to obtain the information carried in the notification message, the service application server may further send a second query request to the core network, the UE, or the access network device, to obtain the information carried in the notification message. Specifically, before the service application server determines the updated radio channel quality requirement information or before the service application server sends the first query request to the third-party network device, the service communication method further includes: sending, by the service application server, the second query request to the core network device, the UE, or the access network device; and receiving, by the service application server, a second query response sent by the core network device, the UE, or the access network device, where the second query response carries at least one of: the radio channel quality of the cell in which the UE is located, the terminal type information of the UE, the carrier information of the cell in which the UE is located, the location information of the UE, the codec information of the service, the load information of the cell in which the UE is located, the RAT information of the network in which the UE is located, and the bandwidth information of the service.

In a possible implementation, after the service application server determines the updated radio channel quality requirement information or after the service application server receives the first query response sent by the third-party network device, the service communication method may further include: sending, by the service application server, a service modification request to the access network device, where the service modification request carries the updated radio channel quality requirement information. The updated radio channel quality requirement information includes at least one of: updated service type indication information of the service, updated codec information of the service, a codec information list of the UE, and the terminal type information of the UE, and the codec information list of the UE includes codec information supported by both the UE and the service application server. In this solution, after determining the updated radio channel quality requirement information based on the information carried in the notification message, the service application server may send, to the access network device in a timely manner, the service modification request that carries the updated radio channel quality requirement information. To be specific, in this solution, the radio channel quality requirement information of the service can be adjusted in a timely manner, to ensure that after the service is created, the service can be normally executed and user experience brought by executing the service is improved.

In a possible implementation, after receiving the notification message sent by the access network device, the service application server may further determine, based on the information carried in the notification message, that the service may be terminated, and instruct the access network device to terminate the service. The service application server may perform, in the following manner, the step of "determining, based on the information carried in the notification message, that the service is to be terminated, and instructing the access network device to terminate the service". Manner 1: The service application server determines, based on an MOS requirement of the service and at least one piece of the following information carried in the notification message: radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which UE is located, and the bandwidth information of the service, that the service is to be terminated. The service application server sends a service deletion request to the access network device or the UE. Manner 2: The service application server sends a first query request to a third-party network device, where the first query request carries an MOS requirement of the service and at least one of: radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which the UE is located, and the bandwidth information of the service. The service application server receives a first query response sent by the third-party network device, where the first query response carries information for instructing to terminate the service. The service application server sends a service deletion request to the access network device or the UE. After receiving the notification message, if determining that the radio channel quality requirement information of the service cannot be further adjusted to enable the radio channel quality of the cell in which the UE is located to meet the radio channel quality requirement corresponding to the radio channel quality requirement information of the service, the service application server may determine that the service is to be terminated. When terminating the service, the access network device may release a radio resource allocated to the service, so that the radio resource allocated to the service can serve another service, thereby improving radio resource utilization.

In a possible implementation, the notification message is transmitted by using an IP data packet, a UDP data packet, or an RTP data packet of the service.

It should be noted that, for detailed descriptions of the codec information, the radio channel quality requirement, the terminal type information of the UE, the radio channel quality, and the like in the second aspect of this embodiment of this disclosure, refer to related content in the first aspect of this disclosure. Details are not described herein again.

According to a third aspect, an access network device is further provided, including a receiving module and a sending module. The receiving module is configured to receive, by the access network device, a service establishment request sent by a core network device or a service application server, where the service establishment request carries radio channel quality requirement information of a service, and the radio channel quality requirement information of the service is used to indicate, to the access network device or the core network device, a radio channel quality requirement for executing the service by UE. The sending module is configured to send a notification message to the core network device or the service application server, where the notification message carries information reflecting an actual network status of a cell in which the UE is located, and the actual network status of the cell in which the UE is located is used by the service application server to determine updated radio channel quality requirement information.

In a possible implementation, the information that is carried in the notification message sent by the sending module and that reflects the actual network status of the cell in which the UE is located includes at least one of: terminal type information of the UE, carrier information of the cell in which the UE is located, location information of the UE, load information of the cell in which the UE is located, RAT information of a network of the cell in which the UE is located, recommended-codec information, and bandwidth information of the service.

In a possible implementation, the radio channel quality requirement information includes at least one of: service type indication information of the service, codec information of the service, a codec information list of the UE, and the terminal type information of the UE, and the codec information list of the UE includes codec information supported by both the UE and the service application server.

In a possible implementation, the sending module may be further configured to: before sending the notification message to the core network device or the service application server, deliver a measurement control command to the UE. The receiving module is further configured to receive a measurement report sent by the UE, where the measurement report carries radio channel quality of the cell in which the UE is located. Radio channel quality that is of the cell in which the UE is located and that is carried in the notification message sent by the sending module is the radio channel quality that is of the cell in which the UE is located and that is carried in the measurement report received by the receiving module.

In a possible implementation, the receiving module may be further configured to: after the sending module sends the notification message to the core network device or the service application server, receive a service modification request sent by the service application server, where the service modification request carries the updated radio channel quality requirement information. The updated radio channel quality requirement information includes at least one of: updated service type indication information of the service, updated codec information of the service, a codec information list of the UE, and the terminal type information of the UE, and the codec information list of the UE includes codec information supported by both the UE and the service application server.

In a possible implementation, the receiving module is further configured to: after the sending module sends the notification message to the core network device or the service application server, receive a service deletion request sent by the service application server. Correspondingly, the access network device may further include a termination module, configured to terminate the service after the receiving module receives the service deletion request.

In a possible implementation, the notification message sent by the sending module is transmitted by using an IP data packet, a UDP data packet, or an RTP data packet of the service.

It should be noted that, for detailed descriptions of parameters such as the codec information, the radio channel quality requirement, and the terminal type information of the UE in the third aspect of this embodiment of this disclosure, refer to related content in the first aspect of this disclosure. Details are not described herein again.

According to a fourth aspect, an access network device is provided, including one or more processors, a memory, a bus, and a communications interface. The one or more processors, the memory, and the communications interface are connected to each other by using the bus system. The one or more application programs are stored in the memory. The one or more application programs include an instruction. When the processor of the access network device executes the instruction, the access network device performs the service communication method in the first aspect and the possible implementations of the first aspect.

According to a fifth aspect, a computer readable storage medium is provided, where the computer readable storage medium stores one or more programs, the one or more programs include an instruction, and when a processor of an access network device executes the instruction, the access network device performs the service communication method in the first aspect and the possible implementations of the first aspect.

It should be noted that, the modules in the access network device in the third aspect, the fourth aspect, and the possible implementations of the third aspect and the fourth aspect in the embodiments of this disclosure are obtained by performing function division on the access network device, to implement the service communication method in the first aspect and the possible implementations of the first aspect. For specific descriptions and effect analysis of functions implemented by the modules in the third aspect, the fourth aspect, and the possible implementations of the third aspect and the fourth aspect, refer to detailed descriptions in the first aspect and the possible implementations of the first aspect. Details are not described again in the embodiments of this disclosure.

According to a sixth aspect, a service application server is provided, including a sending module and a receiving module. The sending module is configured to send a service establishment request to an access network device or a core network device, where the service establishment request carries radio channel quality requirement information of a service, and the radio channel quality requirement information of the service is used to indicate, to the access network device or the core network device, a radio channel quality requirement for executing the service by UE. The receiving module is configured to receive a notification message sent by the access network device or the core network, where the notification message carries information reflecting an actual network status of a cell in which the UE is located, and the actual network status of the cell in which the UE is located is used by the service application server to determine updated radio channel quality requirement information.

In a possible implementation, the information that is carried in the notification message received by the receiving module and that reflects the actual network status of the cell in which the UE is located includes at least one of: terminal type information of the UE, carrier information of the cell in which the UE is located, location information of the UE, load information of the cell in which the UE is located, RAT information of a network of the cell in which the UE is located, recommended-codec information, and bandwidth information of the service.

In a possible implementation, the radio channel quality requirement information includes at least one of: service type indication information of the service, codec information of the service, a codec information list of the UE, and the terminal type information of the UE, and the codec information list of the UE includes codec information supported by both the UE and the service application server.

In a possible implementation, the service application server may further include a first determining module. The first determining module is configured to: after the receiving module receives the notification message, determine the updated radio channel quality requirement information based on an MOS requirement of the service and at least one piece of the following information carried in the notification message: radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which the UE is located, and the bandwidth information of the service.

In a possible implementation, the sending module may be further configured to send a first query request to a third-party network device, where the first query request carries an MOS requirement of the service and at least one of: radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which the UE is located, and the bandwidth information of the service. The receiving module is further configured to receive a first query response sent by the third-party network device, where the first query response carries the updated radio channel quality requirement information.

In a possible implementation, the sending module is further configured to: before the first determining module determines the updated radio channel quality requirement information or before the sending module sends the first query request to the third-party network device, send a second query request to the core network device, the UE, or the access network device. The receiving module is further configured to receive a second query response sent by the core network device, the UE, or the access network device, where the second query response carries at least one of: the radio channel quality of the cell in which the UE is located, the terminal type information of the UE, the carrier information of the cell in which the UE is located, the location information of the UE, the codec information of the service, the load information of the cell in which the UE is located, the RAT information of the network in which the UE is located, and the bandwidth information of the service.

In a possible implementation, the sending module is further configured to: after the determining module determines the updated radio channel quality requirement information or after the receiving module receives the first query response sent by the third-party network device, send a service modification request to the access network device, where the service modification request carries the updated radio channel quality requirement information. The updated radio channel quality requirement information includes at least one of: updated service type indication information of the service, updated codec information of the service, a codec information list of the UE, and the terminal type information of the UE, and the codec information list of the UE includes codec information supported by both the UE and the service application server.

In a possible implementation, the service application server may further include a second determining module. The second determining module is configured to: after the receiving module receives the notification message sent by the access network device, determine, based on an MOS requirement of the service and at least one piece of the following information carried in the notification message: radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which UE is located, and the bandwidth information of the service, that the service is to be terminated. The sending module is further configured to send a service deletion request to the access network device or the UE.

In a possible implementation, the sending module may be further configured to send a first query request to a third-party network device, where the first query request carries an MOS requirement of the service and at least one of: radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which the UE is located, and the bandwidth information of the service. The receiving module may be further configured to receive a first query response sent by the third-party network device, where the first query response carries information for instructing to terminate the service. The sending module is further configured to send a service deletion request to the access network device or the UE.

In a possible implementation, the notification message sent by the sending module is transmitted by using an IP data packet, a UDP data packet, or an RTP data packet of the service.

It should be noted that, for detailed descriptions of the codec information, the radio channel quality requirement, the terminal type information of the UE, the radio channel quality, and the like in the sixth aspect of this embodiment of this disclosure, refer to related content in the first aspect of this disclosure. Details are not described herein again.

According to a seventh aspect, a service application server is provided, including one or more processors, a memory, a bus, a communications interface. The one or more processors, the memory, and the communications interface are connected to each other by using the bus system. The one or more application programs are stored in the memory. The one or more application programs include an instruction. When the processor of the service application server executes the instruction, the service application server performs the service communication method in the second aspect and the possible implementations of the second aspect.

According to an eighth aspect, a computer readable storage medium is provided, where the computer readable storage medium stores one or more programs, the one or more programs include an instruction, and when a processor of the service application server executes the instruction, the service application server performs the service communication method in the second aspect and the possible implementations of the second aspect.

It should be noted that, the modules in the service application server in the sixth aspect, the seventh aspect, and the possible implementations of the sixth aspect and the seventh aspect in the embodiments of this disclosure are obtained by performing function division on the service application server, to implement the service communication method in the second aspect and the possible implementations of the second aspect. For specific descriptions and effect analysis of functions implemented by the modules in the sixth aspect, the seventh aspect, and the possible implementations of the sixth aspect and the seventh aspect, refer to detailed descriptions in the second aspect and the possible implementations of the second aspect. Details are not described again in the embodiments of this disclosure.

BRIEF DESCRIPTION OF DRAWINGS

To describe the technical solutions in the embodiments of this disclosure more clearly, the following briefly describes the accompanying drawings required for describing the embodiments. Apparently, the accompanying drawings in the following descriptions show merely some embodiments of this disclosure, and a person of ordinary skill in the art may derive other drawings from these accompanying drawings without creative efforts.

DESCRIPTION OF EMBODIMENTS

In the specification, claims, and accompanying drawings of this disclosure, the terms "first", "second", and the like are intended to distinguish between different objects but do not indicate a particular order. In addition, the terms "include", "have" and any other variants thereof are intended to cover the non-exclusive inclusion. For example, a process, method, system, product, or device that includes a series of steps or units is not limited to the listed steps or units, but optionally further includes an unlisted step or unit, or optionally further includes another step or unit inherent to the process, method, product, or device.

Technical solutions of this disclosure may be applied to a 2G network, a 3G network, a 4G network, a 5G network, and a subsequent evolved network. The technical solutions of this disclosure are not only applicable to a VoLTE service and a video call service, but also applicable to another service that has a similar requirement on network signal coverage. In this disclosure, no limitation is imposed on a service type of user equipment and a network in which the user equipment is located.

Figure 1:
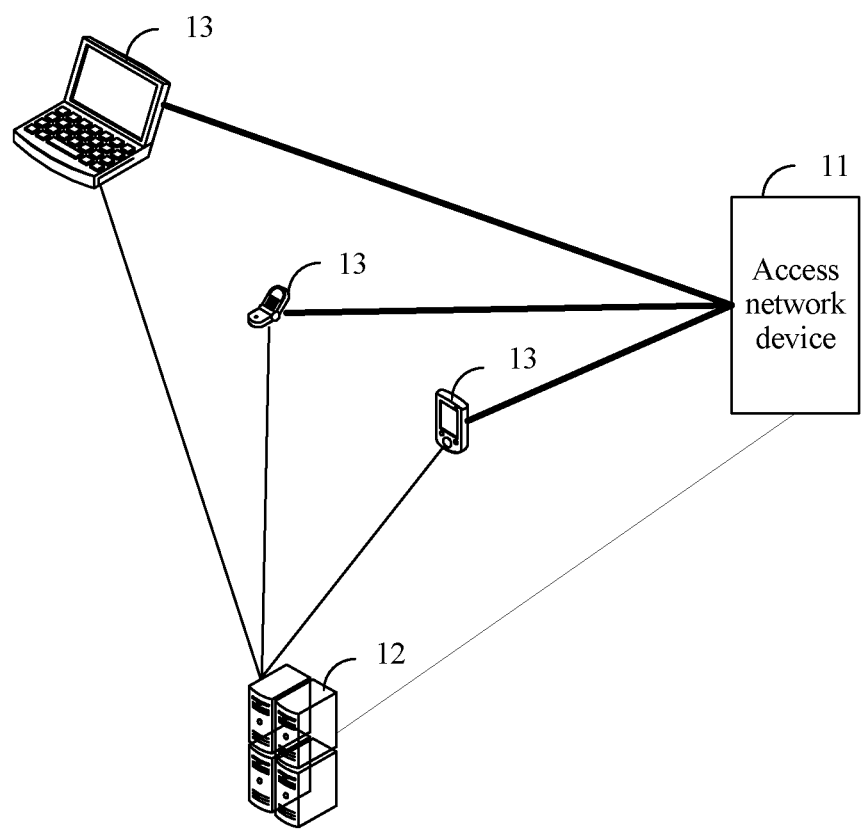
FIG. 1 is a schematic diagram of a network architecture of a communications network according to an embodiment of this disclosure.

FIG. 1 is a schematic diagram of a network architecture of a communications network according to an embodiment of this disclosure. As shown in FIG. 1, the communications network may include an access network device 11, a service application server 12, and at least one UE 13. The access network device 11 and the UE 13 may be connected to each other by using a radio communication link. The service application server 12 is configured to be responsible for processing of a service registration request of the UE, user management, session control, service exchange, service control, and the like. Another core network device may further exist between the access network device 11 and the service application server 12. The core network device may be configured to play a role for connecting a service between the UE 13 and the service application server 12.

Figure 2:
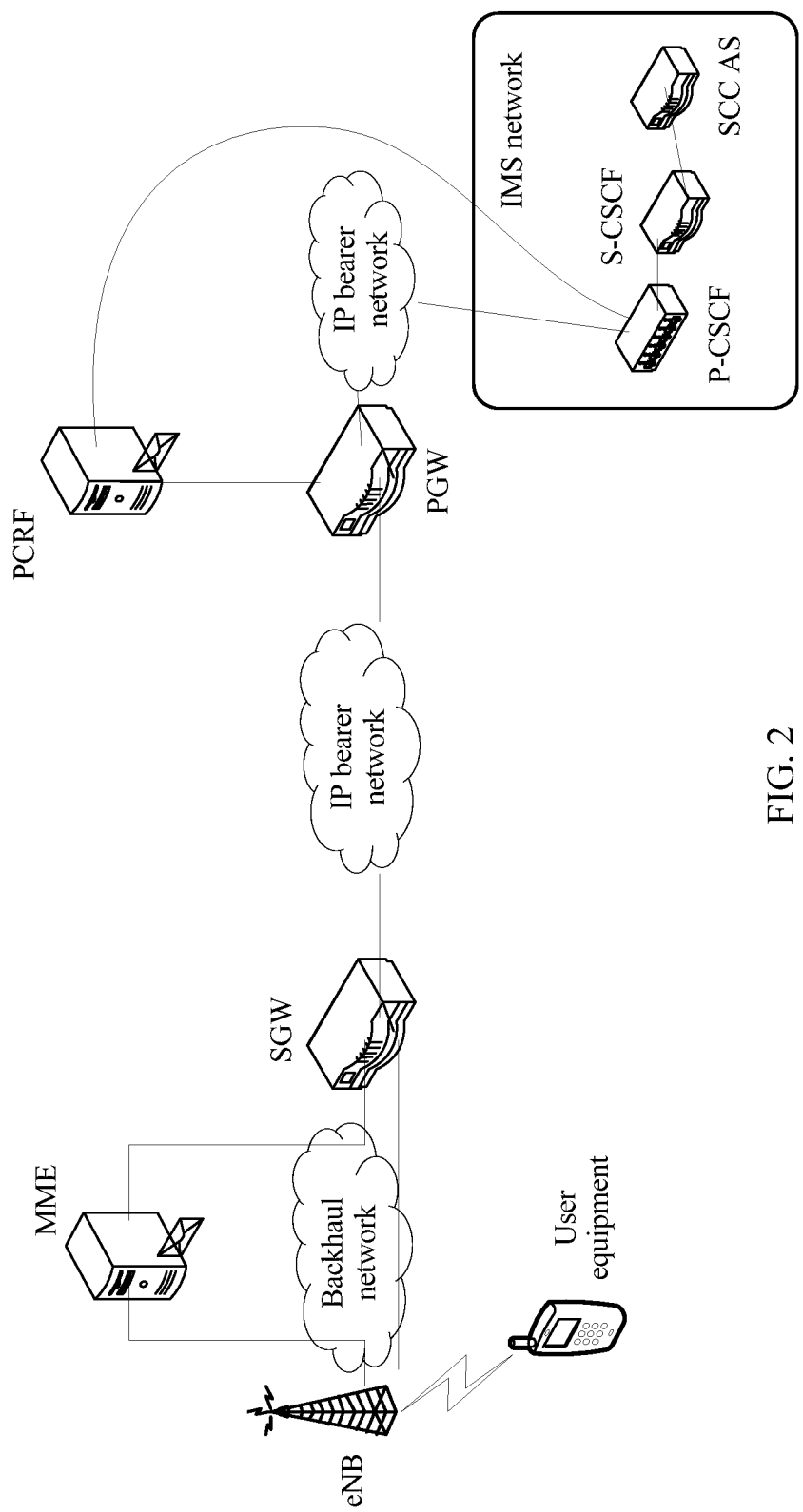
FIG. 2 is a schematic diagram of a network architecture of another communications network according to an embodiment of this disclosure.

FIG. 2 shows an actual example in which the network architecture of the communications network shown in FIG. 1 is a 4G network. An evolved NodeB (eNB) in FIG. 2 is used as the access network device in FIG. 1, and the eNB and UE (namely, the UE 13 in FIG. 1) may be communicatively connected to each other by using a radio link. A core network device in an LTE network having the network architecture shown in FIG. 2 as an example may include a mobility management entity (MME), a serving gateway (SGW), a packet data network gateway (PGW), a policy and charging rules function (PCRF) entity, and the like. The core network device may be responsible for connecting a service such as a VoLTE service of the UE to an Internet Protocol multimedia subsystem (IMS) network, and is responsible for transmitting signaling related to a VoLTE call and the like between the UE and the IMS network. In addition, the core network device may be further responsible for establishing a dedicated bearer (for example, a quality of service class identifier (QCI) is equal to 1) related to the VoLTE service, and the dedicated bearer is used to transmit user plane data (media data) related to the VoLTE service.

An IMS network device shown in FIG. 2, such as a proxy-call session control function (P-CSCF) entity, an interrogating/serving-call session control function (S-CSCF) entity, and a service centralization and continuity application server (SCC AS), may be used as any service application server described in this embodiment of this disclosure.

The P-CSCF entity (which may fall into an originating P-CSCF entity and a terminating P-CSCF entity) is the first contact point for the UE to access the IMS network in a process of a service such as a VoLTE service. The P-CSCF entity may be configured to: process signaling related to a service such as a VoLTE service and complete routing control. The S-CSCF entity (which may fall into an originating S-CSCF entity and a terminating S-CSCF entity) is a service exchange center in the IMS network. The S-CSCF entity may be mainly responsible for receiving and processing of a service registration request of the UE, user management, session control, service exchange, service control, processing of a Session Initiation Protocol (SIP) message, charging, and the like. The SCC AS (which may fall into an originating SCC AS and a terminating SCC AS) is configured to maintain service continuity when the UE moves between the LTE network and another network.

In this embodiment of this disclosure, the UE may be a wireless terminal or a wired terminal, for example, the UE may be a mobile phone, a computer, a tablet computer, a personal digital assistant (PDA), a mobile Internet device (MID), a wearable device, an e-book reader, and the like.

Some technical solutions in the embodiments of this disclosure may be implemented based on the communications network architecture shown in FIG. 1 or a variant of the architecture.

Figure 3:
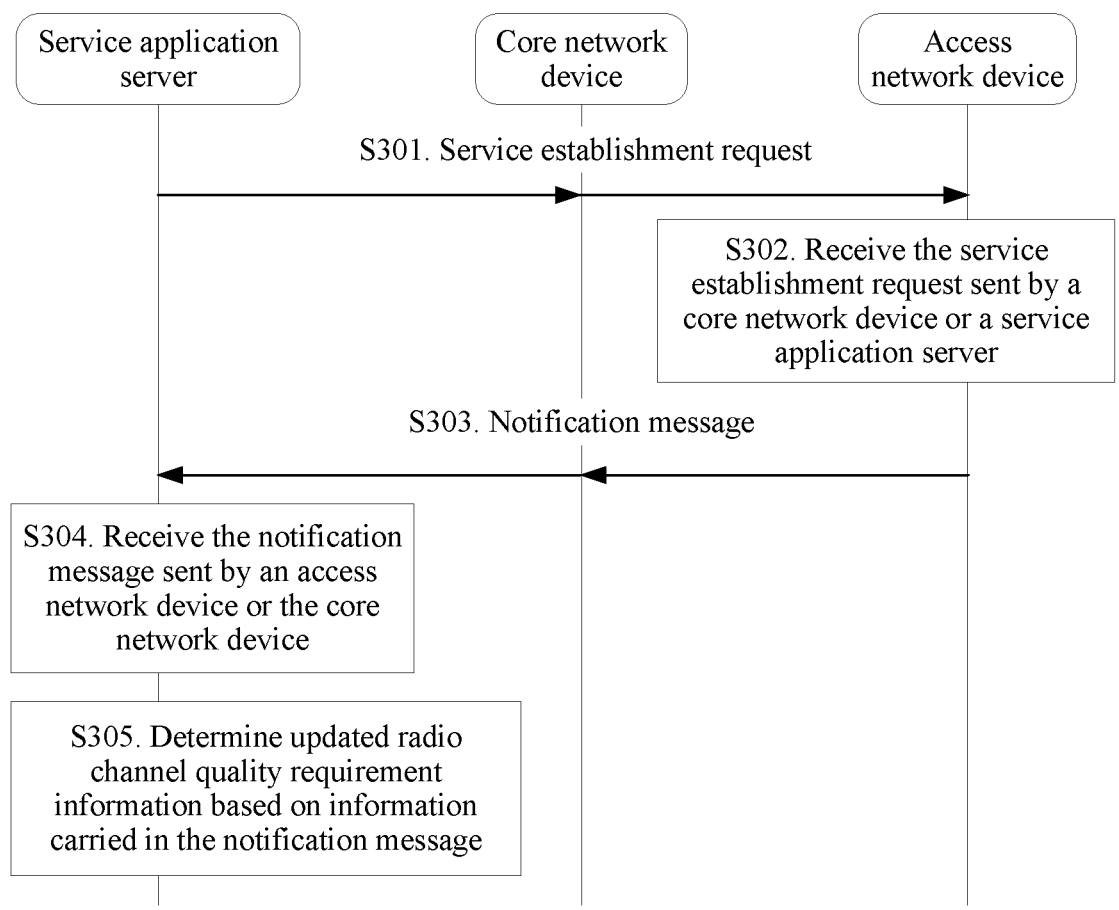
FIG. 3 is a flowchart of a service communication method according to an embodiment of this disclosure.

An embodiment provides a service communication method. As shown in FIG. 3, the service communication method includes the following steps.

S301. A service application server sends a service establishment request to an access network device or a core network device.

The service establishment request may carry radio channel quality requirement information of a service. The radio channel quality requirement information of the service is used to indicate, to the access network device or the core network device, a radio channel quality requirement for executing the service by UE.

It should be noted that, the service application server in this embodiment is obtained by integrating any one or at least two of service application servers such as a P-CSCF, an ATCF, an S-CSCF, and an SCC AS in an IMS network.

The service establishment request may be delivered by the service application server to the access network device after the service application server receives a request message for establishing a service for the UE. The service may be a VoLTE voice service, a video service, or a service of another service type.

For example, the service is a VoLTE voice service. After receiving an invite message for establishing a VoLTE voice service for the UE, the service application server (for example, the P-CSCF, the ATCF, the S-CSCF, or the SCC AS) may send a service establishment request message (namely, the foregoing service establishment request) to the access network device (for example, an eNB). The service establishment request is used to request the access network device (for example, the eNB) to allocate a radio network resource to the VoLTE voice service. The UE may be an originating UE, and the service application server is correspondingly a service application server as an originating party. Alternatively, the UE may be a terminal UE, and the service application server is correspondingly a service application server as a terminating party.

For example, the service application server may send the service establishment request to the access network device in either of the following two implementations:

Manner 1: The service application server delivers the service establishment request to the access network device by using the core network device.

A VoLTE voice service is used as an example. After receiving an invite message for establishing a VoLTE voice service for the UE, the service application server may send an authentication authorization request to a PCRF, to trigger an evolved packet system (EPS) core network device to initiate a voice dedicated bearer establishment process. The authentication authorization request includes radio channel quality requirement information of the VoLTE voice service. The EPS core network device may send a voice dedicated bearer establishment request message to the access network device. The voice dedicated bearer establishment request message includes the radio channel quality requirement information of the VoLTE voice service.

Manner 2: The service application server delivers the service establishment request to the access network device through an interface between the service application server and the access network device.

The interface between the service application server and the access network device may be a private interface that is provided by a device vendor and that is between the service application server and the access network device. The service application server may directly deliver the service establishment request (for example, a request for establishing a VoLTE voice service) to the access network device through the private interface. The service establishment request carries the radio channel quality requirement information of the service. A related request message (for example, the service establishment request) sent through the private interface may be carried in an extension header of an RTP stream.

Optionally, the radio channel quality requirement information of the service may be information that directly reflects a requirement of the service on radio channel quality, for example, at least one of: an RSRP requirement, an RSRQ requirement, and an SINR requirement. The radio channel quality requirement information of the service may be information that indirectly reflects a requirement of the service on radio channel quality, for example, at least one of: service type indication information of the service, codec information of the service, a codec information list of the UE, and terminal type information of the UE. The codec information list of the UE includes codec information supported by both the UE and the service application server. The codec information of the service includes codec type information of the service and codec mode set information of the service. The terminal type information of the UE includes at least one of: an IMEI of the UE, a TAC of an IMEI, and an IMSI of the UE.

For example, the following uses an example to provide a specific manner in which the radio channel quality requirement information of the service indicates the radio channel quality requirement for executing the service by the UE.

For example, it is assumed that the radio channel quality requirement information of the service includes the service type indication information of the service. The access network device may determine, based on the service type indication information, a specific type of the service (for example, a VoLTE voice service, a video service, or another type of service). Then, the access network device may determine, based on the service type of the service and a pre-configured correspondence between a service type and a radio channel quality requirement, the radio channel quality requirement for executing the service by the UE. For another example, it is assumed that the radio channel quality requirement information of the service includes the codec information of the service. The access network device may determine, based on the codec information of the service, a radio channel quality requirement corresponding to the codec information of the service.

S302. The access network device receives the service establishment request sent by the core network device or the service application server.

For example, if the service application server sends the service establishment request to the access network device in the foregoing manner 1, the access network device may receive, by using the core network device, the service establishment request sent by the service application server. If the service application server sends the service establishment request to the access network device in the foregoing manner 2, the access network device may directly receive, through the private interface between the service application server and the access network device, the service establishment request sent by the service application server.

After receiving the service establishment request sent by the core network device or the service application server, the access network device may send a service establishment response to the core network device or the service application server. The service establishment response is used to notify the core network device or the service application server that the access network device accepts the service establishment request.

Radio channel quality of each cell in a network may change at any time. For example, radio channel quality of a cell in which the UE is located may not meet the radio channel quality requirement corresponding to the radio channel quality requirement information of the service. In this way, the access network device may send a notification message to the core network device or the service application server, so that the service application server can adjust the radio channel quality requirement information based on information carried in the notification message, to obtain updated radio channel quality requirement information. In some embodiments, after S302, the method in this embodiment of this disclosure may further include S303 to S305.

S303. The access network device sends a notification message to the core network device or the service application server.

The notification message carries information reflecting an actual network status of the cell in which the UE is located. The actual network status of the cell in which the UE is located is used by the service application server to determine the updated radio channel quality requirement information.

For example, the information that is carried in the notification message and that reflects the actual network status of the cell in which the UE is located may include at least one of: the radio channel quality of the cell in which the UE is located, the terminal type information of the UE, carrier information of the cell in which the UE is located, location information of the UE, load information of the cell in which the UE is located, RAT information of a network of the cell in which the UE is located, recommended-codec information, or bandwidth information of the service.

S304. The service application server receives the notification message sent by the access network device or the core network device.

The notification message in this embodiment of this disclosure may be transmitted by using an IP data packet, a UDP data packet, or an RTP data packet.

S305. The service application server determines updated radio channel quality requirement information based on information carried in the notification message.

The updated radio channel quality requirement information includes at least one of: updated service type indication information of the service, updated codec information of the service, a codec information list of the UE, and the terminal type information of the UE. The codec information list of the UE includes codec information supported by both the UE and the service application server. The updated radio channel quality requirement information is used to indicate, to the access network device, an updated radio channel quality requirement for executing the service by the UE.

According to the service communication method provided in this embodiment of this disclosure, after receiving the service establishment request sent by the service application server, the access network device may send the notification message to the service application server. In addition, the notification message carries the information reflecting the actual network status of the cell in which the UE is located, and the information reflecting the actual network status of the cell in which the UE is located can actually reflect a current network environment status of the UE and a radio resource use status. Therefore, the service application server can adjust the radio channel quality requirement information of the service based on the information carried in the notification message, to determine the updated radio channel quality requirement information. In this solution, the access network device may send the notification message to the service application server, so that the service application server can adjust the radio channel quality requirement information of the service in a timely manner based on the notification message, to ensure that the service is normally executed and improve user experience brought by executing the service.

Optionally, before sending the notification message (namely, S303) to the service application server, the access network device may obtain, from the UE, the radio channel quality of the cell in which the UE is located, and add, into the notification message, the obtained radio channel quality of the cell in which the UE is located, to send the notification message to the service application server. In implementations, before S304 shown in FIG. 3, the method may further include the following: The access network device delivers a measurement control command to the UE; the UE receives the measurement control command sent by the access network device, and measures the radio channel quality of the cell in which the UE is located, to obtain a measurement report; the UE sends the measurement report to the access network device, where the measurement report carries the radio channel quality of the cell in which the UE is located; and the access network device receives the measurement report sent by the UE.

Figure 4:
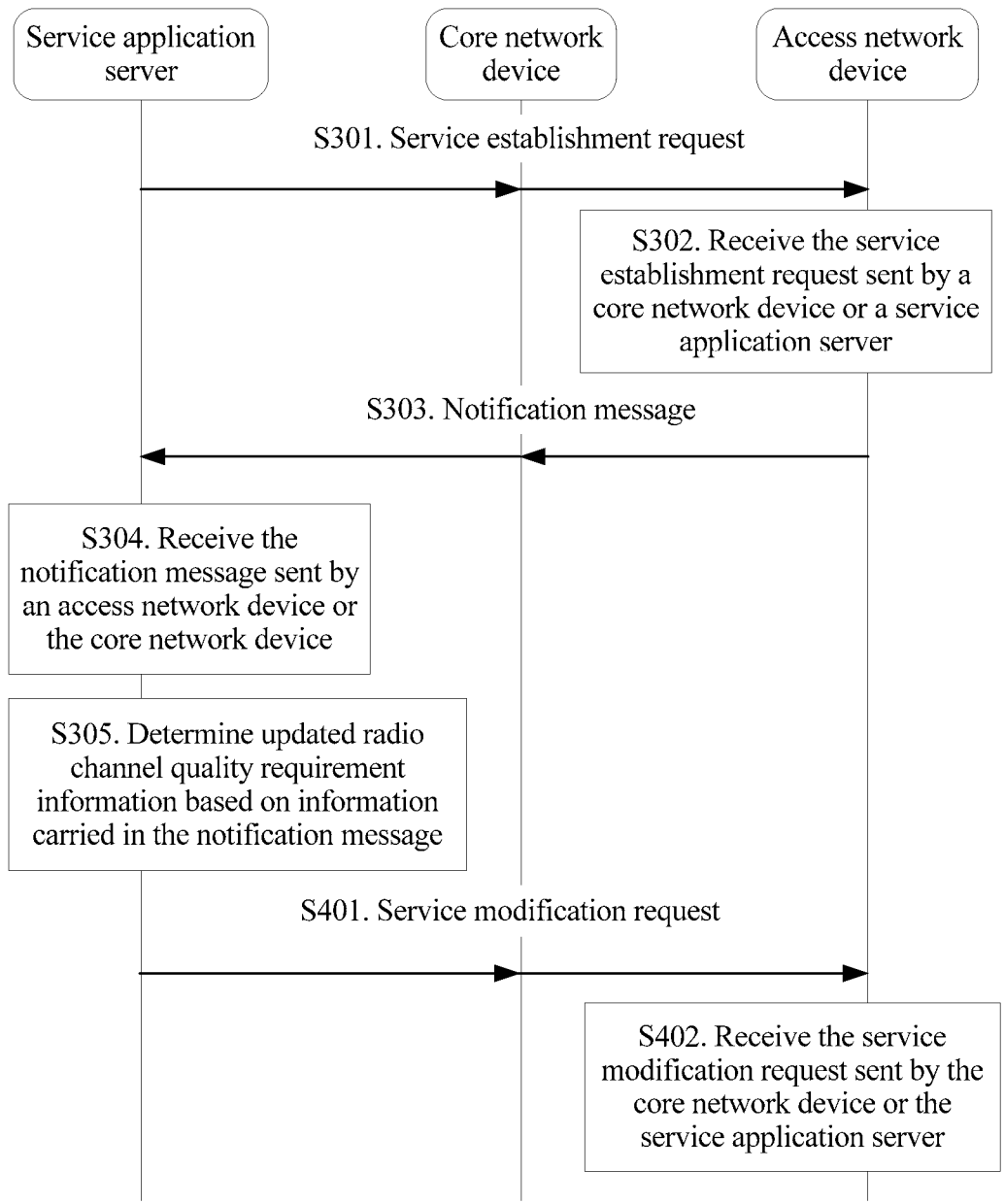
FIG. 4 is a flowchart of another service communication method according to an embodiment of this disclosure.

Because the information carried in the notification message is used to determine the updated radio channel quality requirement information, after receiving the notification message and determining the updated radio channel quality requirement information based on the information carried in the notification message, the service application server may send, to the access network device, a service modification request that carries the updated radio channel quality requirement information. Specifically, as shown in FIG. 4, after S305 shown in FIG. 3, the method in this embodiment of this disclosure may further include S401 and S402.

S401. The service application server sends a service modification request to the core network device or the access network device.

The service modification request carries the updated radio channel quality requirement information.

S402. The access network device receives the service modification request sent by the core network device or the service application server.

The updated radio channel quality requirement information of the service includes at least one of: the updated service type indication information, the updated codec information, the codec information list of the UE, and the terminal type information of the UE. The codec information list of the UE includes the codec information supported by both the UE and the service application server. The updated radio channel quality requirement information of the service is used to indicate, to the access network device, the updated radio channel quality requirement for executing the service by the UE.

In this solution, after determining the updated radio channel quality requirement information of the service based on the information carried in the notification message, the service application server may send, to the access network device in a timely manner, the service modification request that carries the updated radio channel quality requirement information of the service. To be specific, in this solution, the radio channel quality requirement information of the service can be adjusted in a timely manner, to ensure that after the service is created, the service can be normally executed and user experience brought by executing the service is improved.

Figure 5:
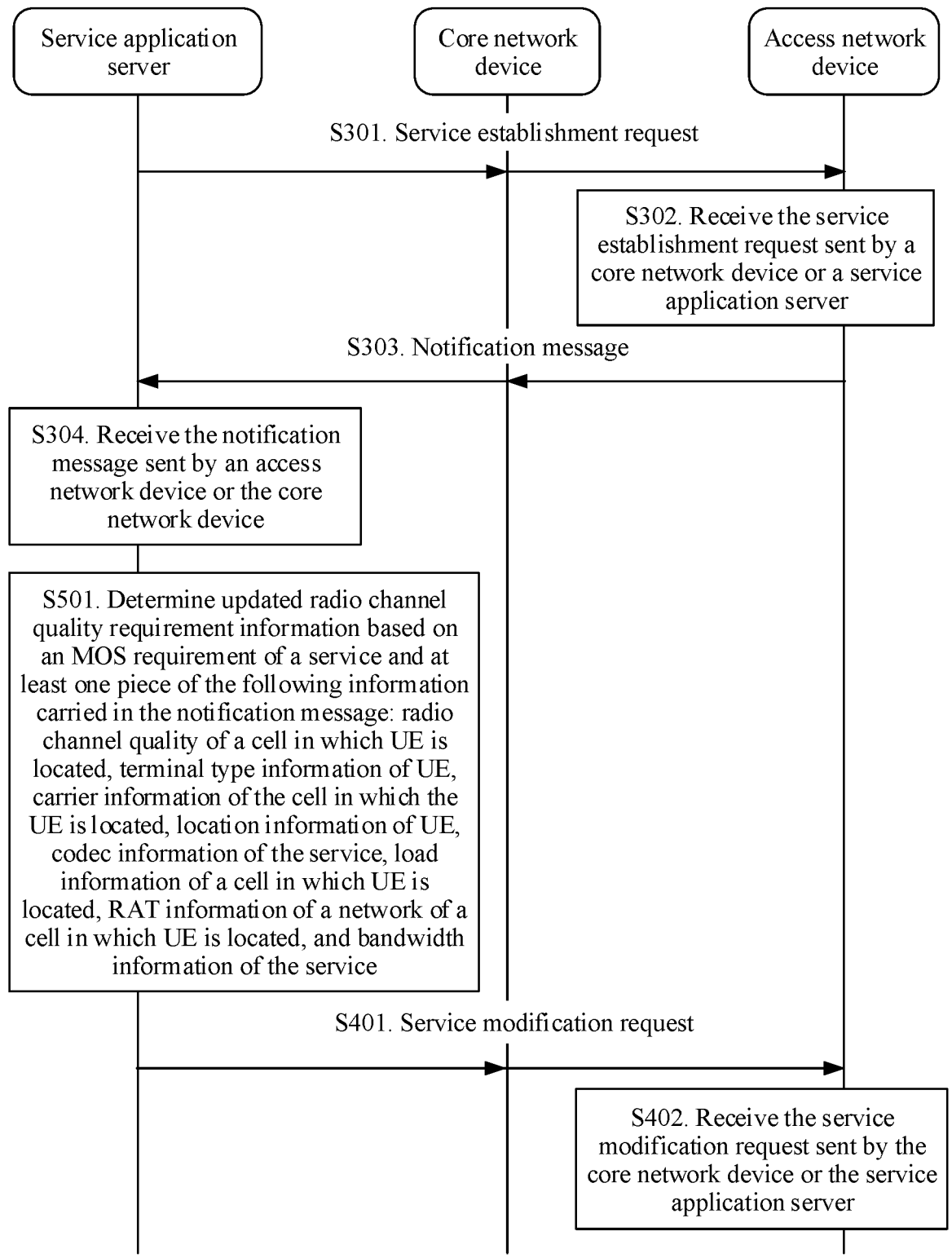
FIG. 5 is a flowchart of another service communication method according to an embodiment of this disclosure.

For example, in an application scenario in this embodiment of this disclosure, the service application server may determine the updated radio channel quality requirement information based on the information carried in the notification message. In some embodiments, S305 shown in FIG. 3 or FIG. 4 may be replaced with S501. As shown in FIG. 5, in this embodiment of this disclosure, an example in which S305 shown in FIG. 4 may be replaced with S501 is used herein to describe the method in this embodiment of this disclosure.

S501. The service application server determines updated radio channel quality requirement information based on an MOS requirement of the service and at least one piece of the following information carried in the notification message: radio channel quality of a cell in which UE is located, terminal type information of UE, information about a carrier accessed by UE, location information of UE, codec information of the service, load information of a cell in which UE is located, RAT information of a network of a cell in which UE is located, and bandwidth information of the service.

For example, the service application server may store a correspondence among the radio channel quality requirement information of the service, the MOS of the service, and at least one piece of the following information carried in the notification message: the radio channel quality of the cell in which the terminal is located, the terminal type information of the terminal, the carrier information of the cell in which the UE is located, the location information of the UE, the codec information of the service, the load information of the cell in which the terminal is located, the RAT information of the network in which the terminal is located, and the bandwidth information of the service. The correspondence is obtained by the service application server by collecting statistics about big data. In this way, the service application server can query the foregoing correspondence based on the MOS requirement of the service and "at least one of: the radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which the UE is located, and the bandwidth information of the service", to determine the updated radio channel quality requirement information of the service.

Figure 6A:
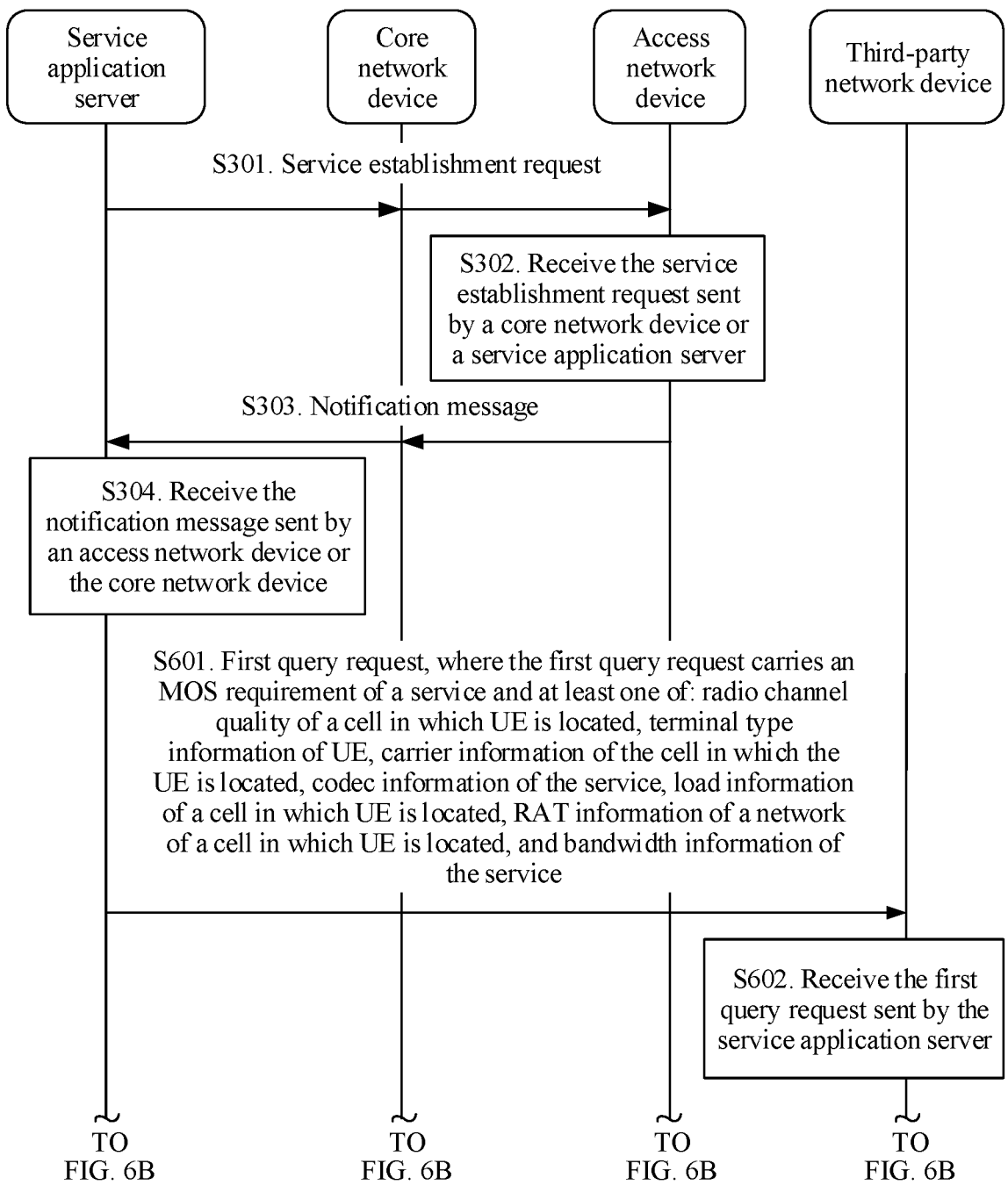
FIG. 6A and FIG. 6B are a flowchart of another service communication method according to an embodiment of this disclosure.
Figure 6B:
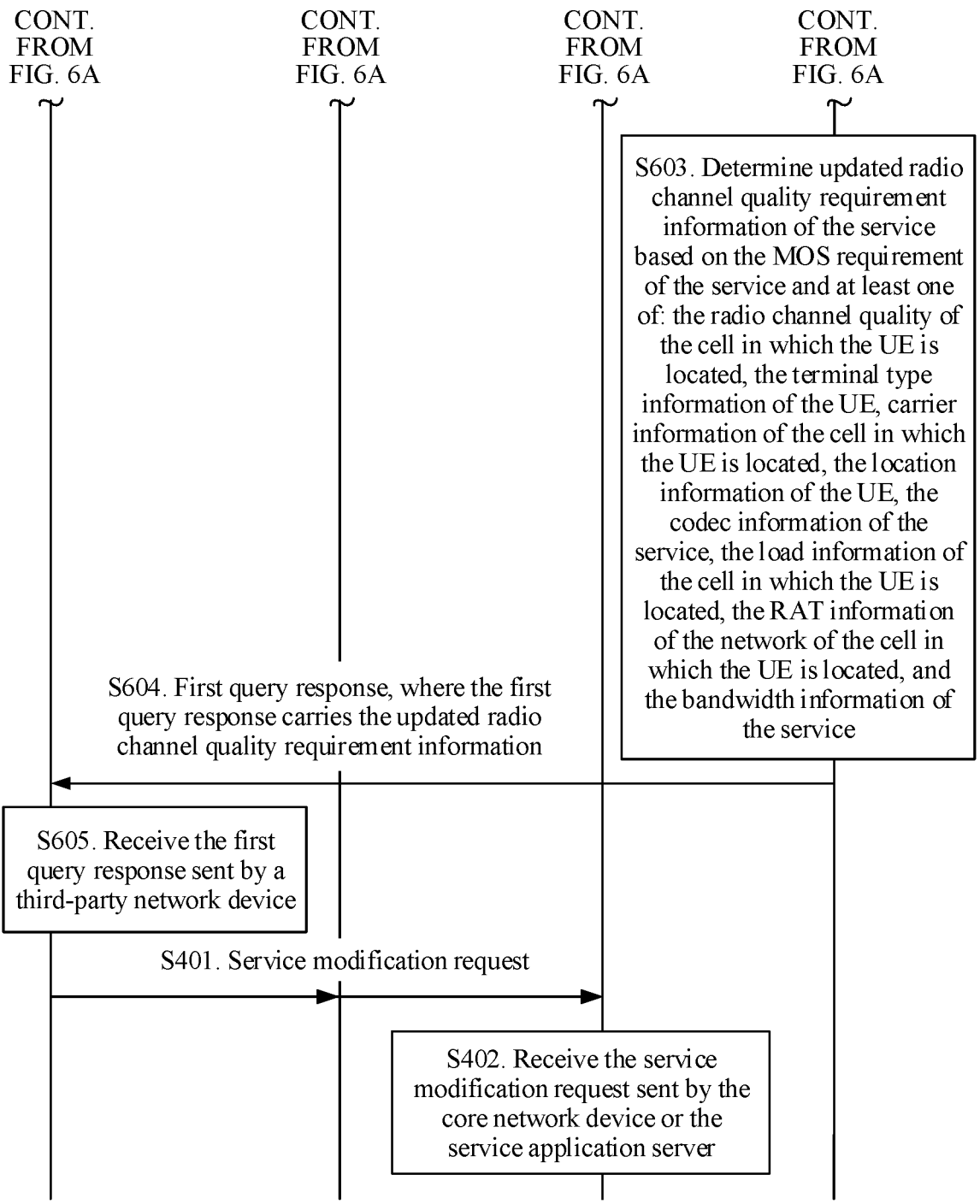

When the service application server does not store the foregoing correspondence, a third-party network device that stores the foregoing correspondence may determine the updated radio channel quality requirement information of the service. Specifically, as shown in FIG. 6A and FIG. 6B, S305 shown in FIG. 4 may be replaced with S601 to S605.

S601. The service application server sends a first query request to a third-party network device, where the first query request carries an MOS requirement of a service and at least one of: radio channel quality of a cell in which UE is located, terminal type information of UE, information about a carrier accessed by UE, location information of UE, codec information of the service, load information of a cell in which UE is located, RAT information of a network of a cell in which UE is located, or bandwidth information of the service.

S602. The third-party network device receives the first query request sent by the service application server.

S603. The third-party network device determines updated radio channel quality requirement information of the service based on the MOS requirement of the service and at least one of: the radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which the UE is located, or the bandwidth information of the service.

It should be noted that, for a method for in which the third-party network device determines the updated radio channel quality requirement information, refer to the method in which the service application server determines the updated radio channel quality requirement information. Details are not described again in this embodiment of this disclosure.

S604. The third-party network device sends a first query response to the service application server, where the first query response carries the updated radio channel quality requirement information.

S605. The service application server receives the first query response sent by the third-party network device.

Similar to the method in which the service application server determines the updated radio channel quality requirement information, the radio channel quality requirement information that is of the service and that is carried in the service establishment request may also be determined by the service application server based on the MOS requirement of the service and at least one of: the radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which the UE is located, and the bandwidth information of the service; or may be determined by the service application server by using the third-party network device.

Optionally, instead of waiting to receive the notification message sent by the access network device, to obtain the information carried in the notification message, the service application server may further send a second query request to the core network, the UE, or the access network device, to obtain the information carried in the notification message. Alternatively, before determining the radio channel quality requirement information that is of the service and that is carried in the service establishment request, the service application server may obtain information used to determine the service requirement, for example, at least one of: the radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which the UE is located, and the bandwidth information of the service.

In a process in which the core network device establishes a video session for an originating UE and a terminal UE, the service application server may obtain "at least one of: the radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which the UE is located, and the bandwidth information of the service".

Specifically, before S501 or S601, the method in this embodiment of this disclosure further includes the following: The service application server sends the second query request to the core network device, the UE, or the access network device, where the second query request is used to instruct the core network device, the UE, or the access network device to query "at least one of: the radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which the UE is located, and the bandwidth information of the service". The core network device, the UE, or the access network device receives the second query request sent by the service application server. The core network device, the UE, or the access network device queries "at least one of: the radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which the UE is located, and the bandwidth information of the service". The core network device, or the UE, or the access network device sends a second query response to the service application server, where the second query response carries at least one of: the radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which the UE is located, and the bandwidth information of the service. The service application server receives the second query response sent by the core network device, the UE, or the access network device.

The service application server may receive a session message sent by the UE, to obtain "at least one of: the radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which the UE is located, and the bandwidth information of the service". Specifically, before S501 or S601, the method in this embodiment of this disclosure may further include the following: The service application server receives a first indication message sent by the UE, where the first indication message carries at least one of: the radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which the UE is located, and the bandwidth information of the service.

For example, the first indication message may be Session Initiation Protocol (SIP) signaling related to the service. The service application server may receive and parse the SIP signaling, to obtain "at least one of: the radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which the UE is located, and the bandwidth information of the service".

Figure 7:
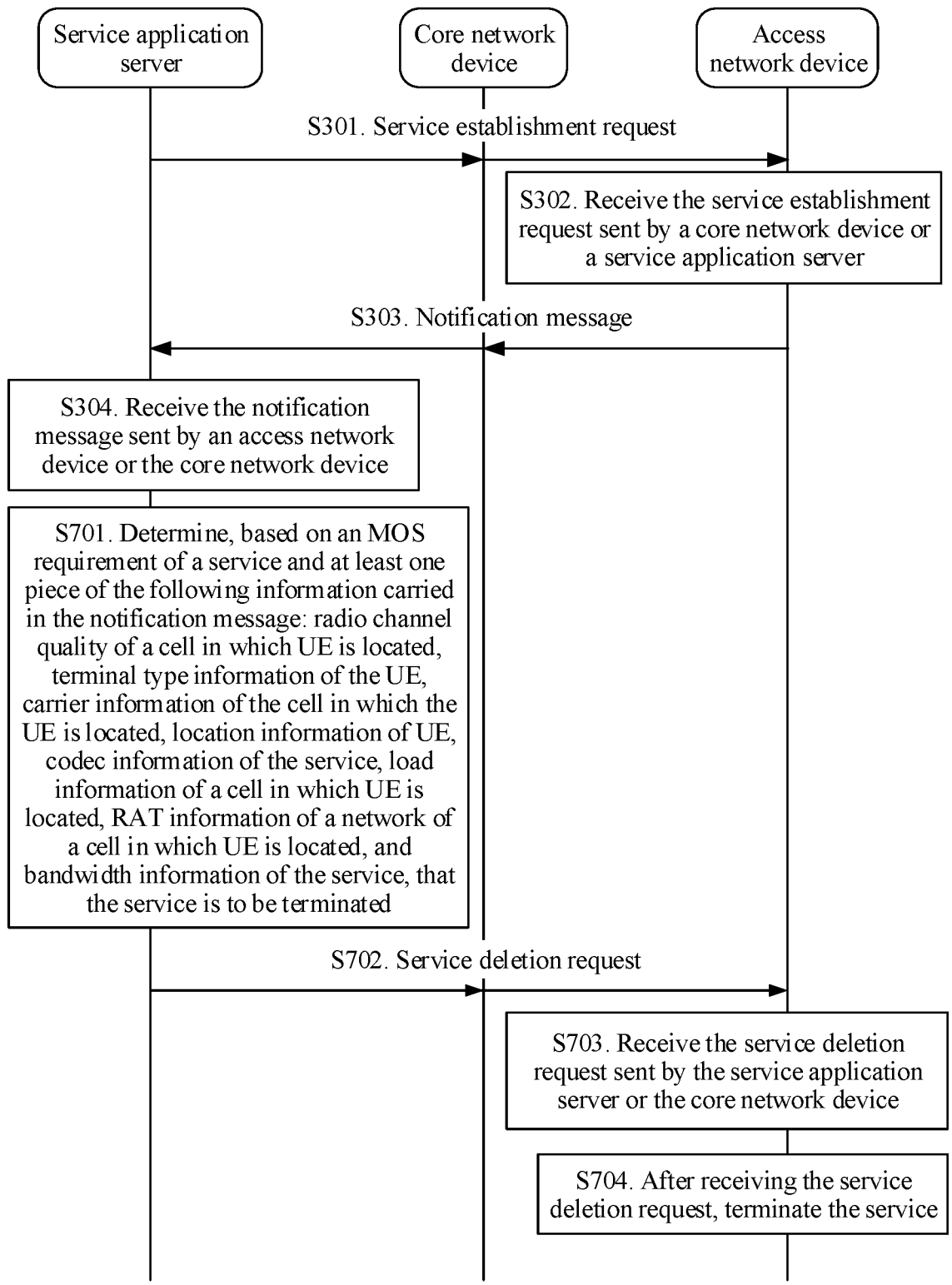
FIG. 7 is a flowchart of another service communication method according to an embodiment of this disclosure.

Further, after receiving the notification message sent by the access network device, the service application server may further determine, based on the information carried in the notification message, that the service may be terminated, and instruct the access network device to terminate the service. In some implementations, as shown in FIG. 7, in an application scenario in this embodiment of this disclosure, after S304 shown in FIG. 3, the method in this embodiment of this disclosure may further include S701~S704.

S701. The service application server determines, based on an MOS requirement of a service and at least one piece of the following information carried in the notification message: radio channel quality of a cell in which UE is located, terminal type information of UE, information about a carrier accessed by UE, location information of UE, codec information of the service, load information of a cell in which UE is located, RAT information of a network of a cell in which UE is located, and bandwidth information of the service, that the service is to be terminated.

S702. The service application server sends a service deletion request to the access network device.

S703. The access network device receives the service deletion request sent by the service application server or the core network device.

S704. After receiving the service deletion request, the access network device terminates the service.

Figure 8A:
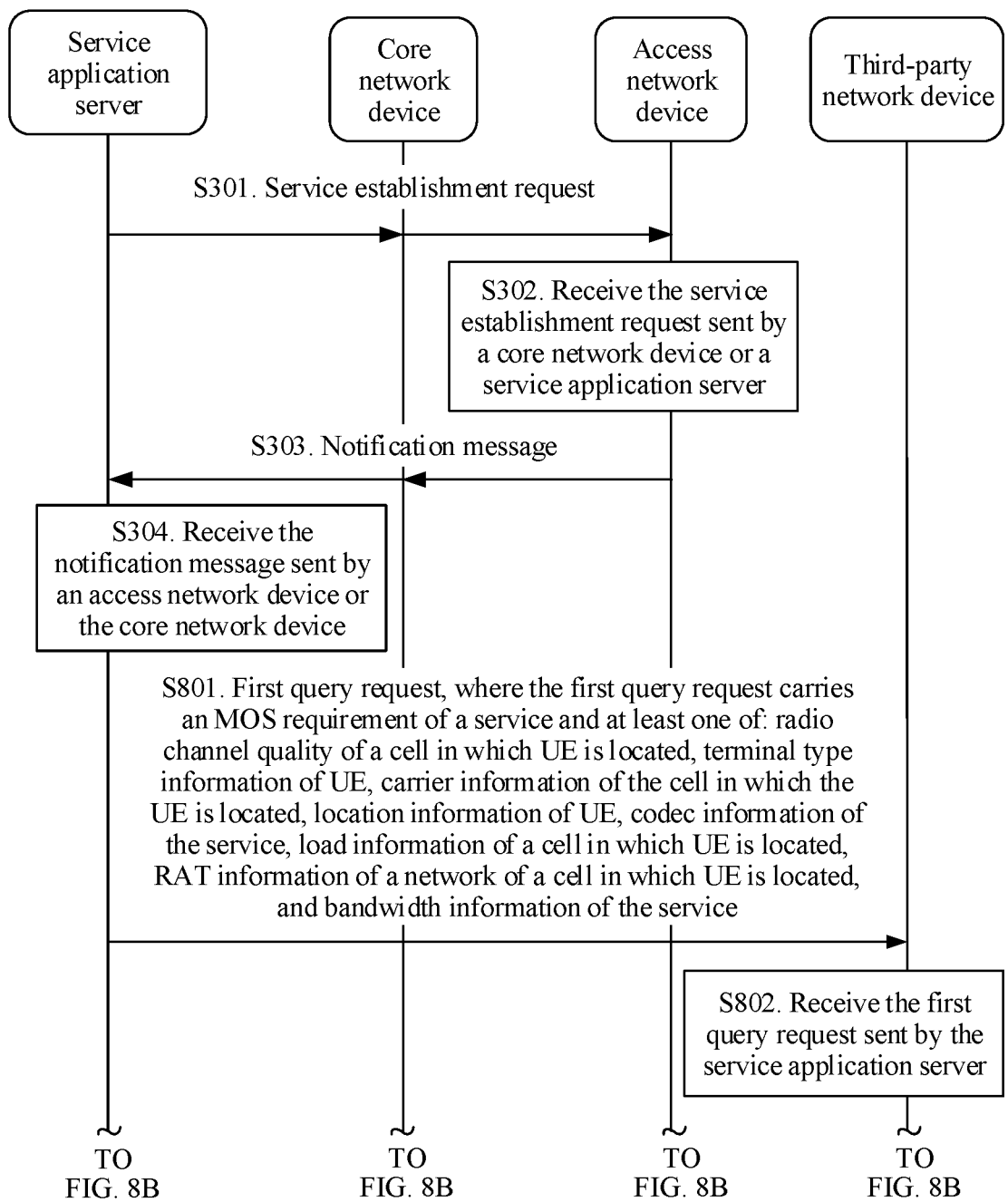
FIG. 8A and FIG. 8B are a flowchart of another service communication method according to an embodiment of this disclosure.
Figure 8B:
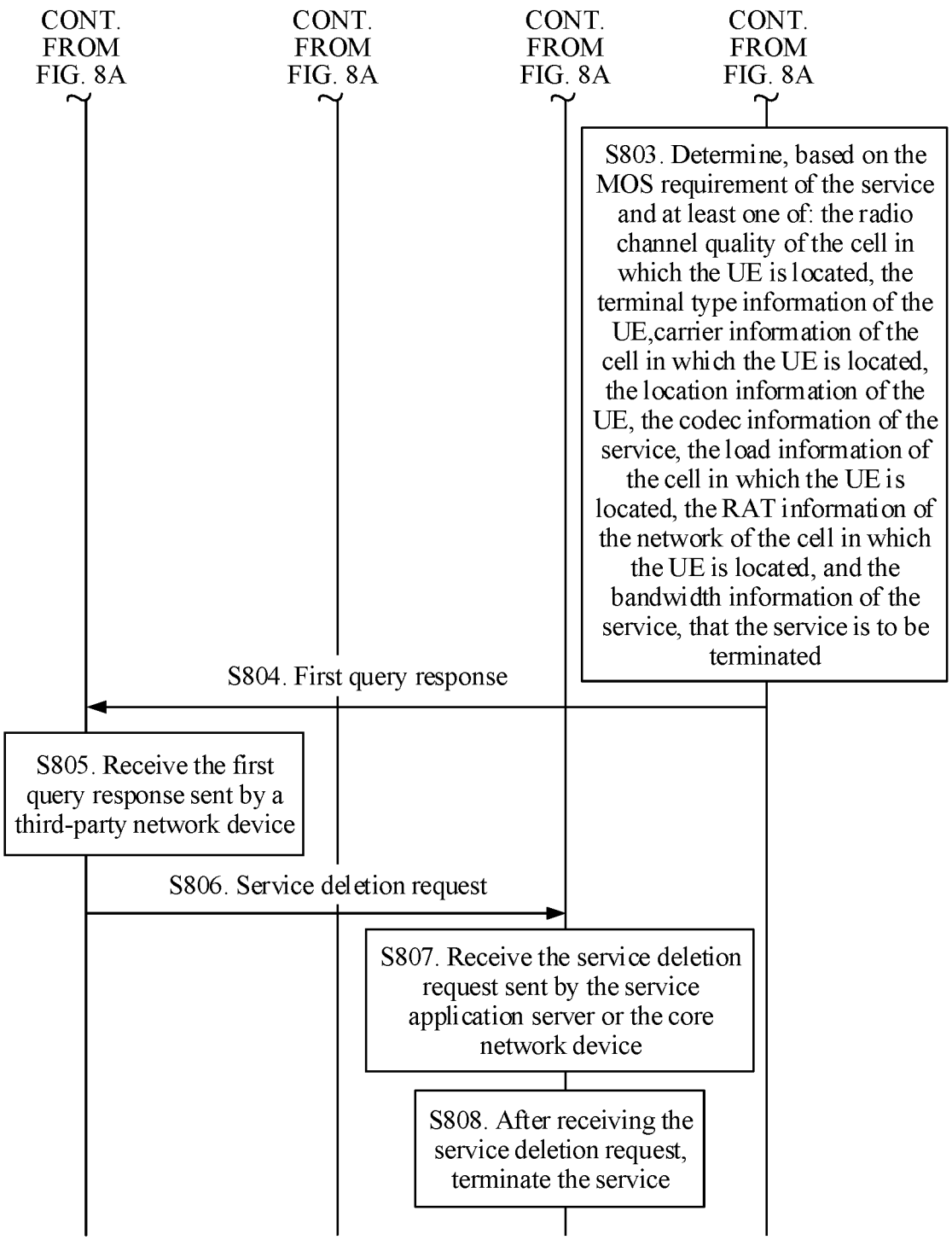

In another implementation, as shown in FIG. 8A and FIG. 8B, after S304 shown in FIG. 3, the method in this embodiment of this disclosure may further include S801 to S805.

S801. The service application server sends a first query request to a third-party network device, where the first query request carries an MOS requirement of the service and at least one of: radio channel quality of a cell in which UE is located, terminal type information of UE, information about a carrier accessed by UE, location information of UE, codec information of the service, load information of a cell in which UE is located, RAT information of a network of a cell in which UE is located, and bandwidth information of the service.

S802. The third-party network device receives the first query request sent by the service application server.

S803. The third-party network device determines, based on the MOS requirement of the service and at least one of: the radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which the UE is located, and the bandwidth information of the service, that the service is to be terminated.

It should be noted that, the method in which "the third-party network device determines, based on the MOS requirement of the service and at least one of: the radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which the UE is located, and the bandwidth information of the service, that the service is to be terminated" is similar to the method in which "the service application server determines that the service is to be terminated" in S701. Details are not described again in this embodiment of this disclosure.

S804. The third-party network device sends a first query response to the service application server, where the first query response carries information for instructing to terminate the service.

S805. The service application server receives the first query response sent by the third-party network device.

S806. The service application server sends a service deletion request to the access network device or the core network device.

S807. The access network device receives the service deletion request sent by the service application server or the core network device.

S808. After receiving the service deletion request, the access network device terminates the service.

In this solution, after receiving the notification message, if determining that the radio channel quality requirement information of the service cannot be further adjusted to enable the radio channel quality of the cell in which the UE is located to meet the radio channel quality requirement corresponding to the radio channel quality requirement information of the service, the service application server may determine that the service is to be terminated. When determining that the service is to be terminated, the service application server may send a service deletion message to UE as an originating party, where the service deletion message may carry a specific cause value of terminating the service. For example, the radio channel quality of the cell in which the UE is located cannot meet the radio channel quality requirement corresponding to the radio channel quality requirement information of the service. The service application server instructs, in a timely manner, the access network device to terminate the foregoing service. When terminating the service, the access network device may release a radio resource allocated to the service, so that the radio resource allocated to the service can serve another service, thereby improving radio resource utilization.

The following describes in detail a service communication method in an embodiment of this disclosure by using a video call service establishment procedure in a 4G network as an example. UE in this embodiment of this disclosure may be an originating UE or a terminal UE of a video call service. Correspondingly, an access network device may be an eNB corresponding to the originating UE or an eNB corresponding to the terminal UE, and a service application server may be an IMS device (for example, a P-CSCF, an S-CSCF, an SCC AS, or an ATCF) corresponding to the originating UE or an IMS device corresponding to the terminal UE. The service communication method provided in this embodiment of this disclosure may include the following steps.

S901. An IMS device receives a request message that is of a video call service and that is sent by an originating UE, establishes a video session for the originating UE and a terminal UE, and negotiates for a service requirement (such as codec information).

In a process in which the IMS device establishes the video session for the originating UE and the terminal UE, the IMS device may negotiate with the originating UE and the terminal UE for the codec information of the video call service. The codec information of the video call service may include a codec type and codec mode set information of the video call. For example, the codec type of the video call may be codec types such as an enhanced voice services (EVS) codec, an adaptive multi-rate wideband speech codec (AMR WB), an adaptive multi-rate narrowband speech codec (AMR NB), and a Moving Picture Experts Group (MPEG) codec. The codec mode set information of the video call may indicate that a codec mode of the video call is 6.60 kbps to 23.85 kbps.

Further, in the process in which "the IMS device establishes the video session for the originating UE and the terminal UE", the IMS device may further obtain other initial parameters of the video call service from the UE, an eNB, or an evolved packet core (EPC) device. The other initial parameters may include a terminal type of the UE, radio channel quality of a 4G cell in which the UE is located, carrier information of the 4G cell in which the UE is located, current location information of the UE, load information of the 4G cell in which the UE is located (for example, whether the cell is overloaded), and bandwidth information required by the video call service. For example, the terminal type of the UE may be at least one of: an IMEI, an IMSI, and an IMEI of the UE. The IMEI included in the other initial parameters may be the first 8-bit TAC of the IMEI, and the TAC is generally used to indicate a model of the UE. The radio channel quality of the 4G cell in which the UE is located may be at least one of: RSRP, RSRQ, and an SINR. The carrier information of the 4G cell in which the UE is located may indicate that a carrier frequency of the 4G cell in which the UE is located is 1800 MHz, 900 MHz, or the like. The current location information of the UE is used to indicate that the UE is located in a 4G cell of a common macro network, a 4G cell of a high-speed railway dedicated network, or the like. The load information of the 4G cell in which the UE is located is used to indicate whether the 4G cell in which the UE is located is overloaded.

For example, in this example, the terminal type information of the UE may be included in related session signaling existing when the UE initiates the video call service. For example, SIP signaling may carry the terminal type information of the UE. The IMS device may receive and parse the SIP signaling to obtain the terminal type information of the UE. Certainly, the IMS device may send a query request, to obtain the terminal type information of the UE from the UE or the EPC device (such as an MME). Certainly, the SIP signaling may further carry information such as the radio channel quality of the 4G cell in which the UE is located.

S902. The IMS device determines radio channel quality requirement information of the video call service based on an MOS requirement of the video call service and at least one of: radio channel quality of a cell in which the UE is located, terminal type information of the UE, carrier information of the cell in which the UE is located, location information of the UE, the codec information of the video call service, load information of a cell in which the UE is located, RAT information of a cell in which the UE is located, and bandwidth information of the video call service.

The radio channel quality requirement information of the video call service is a radio channel quality requirement of the video call service on the eNB. The radio channel quality requirement information of the video call service may include at least one of: service type indication information of the video call service, the codec information of the video call service, and the terminal type of the UE.

The radio channel quality requirement of the video call service may include at least one of: an RSRP requirement, an RSRQ requirement, or an SINR requirement. The radio channel quality requirement of the video call service is used to indicate that the video call service requires that a minimum criterion of the RSRP of the cell in which the UE is located is the RSRP requirement, a minimum criterion of the RSRQ of the cell in which the UE is located is the RSRQ requirement, and a minimum criterion of the SINR of the cell in which the UE is located is the SINR requirement. The codec information of the video call service includes the codec type information of the video call service and the codec mode set information of the video call service. The codec information of the video call service is used to indicate a codec type and a codec mode that are allowed to use for the video call service. The terminal type information of the UE includes at least one of: the IMEI of the UE, the TAC of the IMEI, and the IMSI of the UE.

If an internal database of the IMS device stores a correspondence among the radio channel quality requirement information of the video call service, the MOS of the video call service, and "at least one of: the radio channel quality of the cell in which the terminal is located, the terminal type information of the terminal, the carrier information of the cell in which the UE is located, the location information of the UE, the codec information of the service, the load information of the cell in which the terminal is located, the RAT information of the network in which the terminal is located, and the bandwidth information of the service", the IMS device may query the correspondence, and determine the radio channel quality requirement information of the video call service.

For example, it is assumed that the IMS device sets a value of a preset MOS requirement of the video service to 4.0, that is, a minimum MOS value for a user to fully and fluently enjoy the video call service is 4, and the IMS device has obtained the negotiated codec information (for example, the AMR-WB codec is to be used and the allowed mode set is 6.60 kbps to 23.85 kbps). In this case, the IMS may perform a query in the internal database based on the preset MOS requirement and the codec information, to obtain an RSRP requirement corresponding to the case in which the MOS is 4.0 and the codec information is AMR-WB and 6.60 kbps to 23.85 kbps. For another example, it is assumed that the IMS device sets a value of a preset MOS requirement of the video service to 4.0, and the IMS device has learned that the UE is currently located in the 4G cell of the high-speed railway dedicated network. In this case, the IMS may perform a query in the internal database based on the preset MOS requirement and the location information of the UE, to obtain an SINR requirement corresponding to the case in which the MOS is 4.0 and the UE is located in the cell of the high-speed railway dedicated network. A method in which the IMS device obtains a service requirement based on another parameter is similar to the foregoing example description, and details are not described herein again.

Optionally, if the IMS device does not store the foregoing correspondence, a third-party network device that stores the correspondence may determine the radio channel quality requirement information of the video call service, and then send the determined radio channel quality requirement information of the video call service to the IMS device. A method in which the third-party network device determines the radio channel quality requirement information of the video call service is similar to the method in which the IMS device determines the radio channel quality requirement information of the video call service. Details are not described again in this embodiment of this disclosure.

S903. The IMS device sends a service establishment request of the video call service to an eNB, to trigger the eNB to allocate a radio resource to the video call service, where the establishment request of the video call service carries the radio channel quality requirement information of the video call service.

Figure 9A:
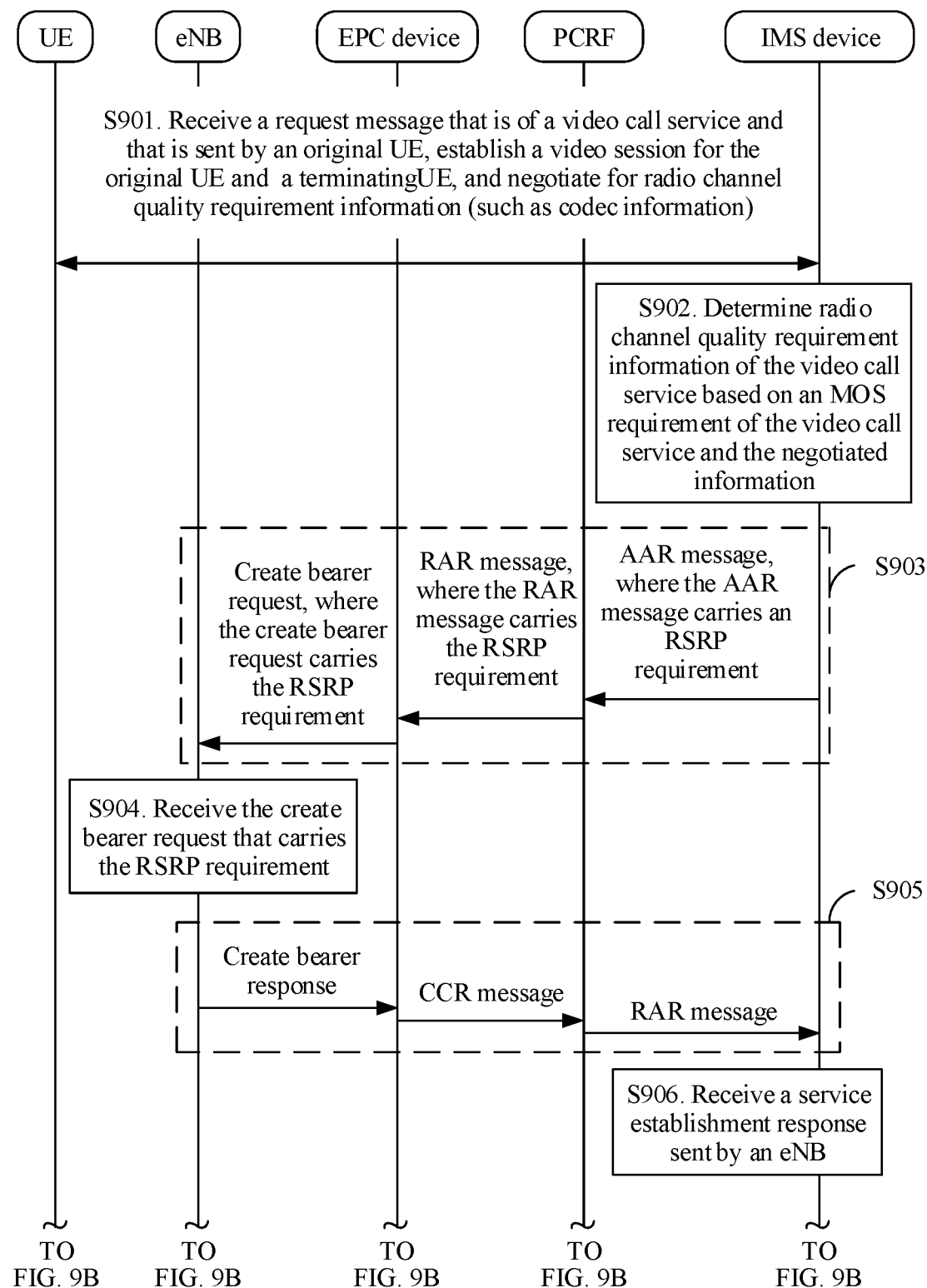
FIG. 9A and FIG. 9B are a flowchart of another service communication method according to an embodiment of this disclosure.

As shown in FIG. 9A, S903 may include the following:

The IMS device initiates an authentication authorization request (AAR) message to a PCRF, to trigger establishment of a dedicated bearer of the video call service. In addition to a user identifier of the UE, an IMS application layer charging identifier, media description information, and the like, the AAR message may further carry the radio channel quality requirement information of the video call service (as shown in FIG. 9A, description is provided by using an example in which the radio channel quality requirement information of the video call service includes the RSRP requirement).

The PCRF may send, to a PGW of an EPC based on the media description information carried in the AAR, a re-authentication request (RAR) message that carries a quality of service (QoS) rule, to trigger the PGW to establish a user plane data dedicated bearer of the video call service. The RAR message carries the radio channel quality requirement information of the video call service (as shown in FIG. 9A, description is provided by using an example in which the radio channel quality requirement information of the video call service includes the RSRP requirement).

After receiving the RAR request sent by the PCRF, the PGW may trigger a procedure of establishing the dedicated bearer of the video call service, and send a create bearer request message to the eNB in an access network by using an SGW and an MME (namely, the EPC device) of the EPC. The create bearer request message carries the radio channel quality requirement information of the video call service (as shown in FIG. 9A, description is provided by using an example in which the radio channel quality requirement information of the video call service includes the RSRP requirement).

In another implementation of this embodiment of this disclosure, the IMS device may directly send the establishment request of the video call service to the eNB. The establishment request of the video call service carries the radio channel quality requirement information of the video call service. For example, if an interface exists between the IMS device and the eNB, the IMS device may send the establishment request of the video call service to the eNB through the interface. The interface between the IMS device and the eNB is the interface between the service application server and the access network device in the foregoing embodiment.

In another implementation of this embodiment of this disclosure, the IMS device (such as an ATCF or an ATGW) may further generate a user plane data packet (such as an RTP data packet), and add the radio channel quality requirement information (such as the RSRP requirement) of the video call service into the user plane data packet. In this way, after receiving the user plane data packet, the eNB can obtain the RSRP requirement by parsing the user plane data packet.

S904. The eNB receives the service establishment request of the video call service.

S905. The eNB sends a service establishment response to the IMS device, where the service establishment response is used to indicate that the eNB accepts the service establishment request.

After receiving the service establishment request, the eNB may accept the service establishment request regardless of whether the radio channel quality of the cell in which the UE is located meets the radio channel quality requirement corresponding to the radio channel quality requirement information of the video call service, and send the service establishment response to the IMS device. Alternatively, after receiving the service establishment request, the eNB may accept the service establishment request after determining that the radio channel quality of the 4G network cell in which the UE is located meets the radio channel quality requirement corresponding to the radio channel quality requirement information of the video call service, and send the service establishment response to the IMS device.

It should be noted that, for a method in which the eNB determines that the radio channel quality of the 4G network cell in which the UE is located meets the radio channel quality requirement corresponding to the radio channel quality requirement information of the video call service, refer to a prior-art method in which the access network device determines that the radio channel quality of the cell in which the UE is located meets the radio channel quality requirement corresponding to the radio channel quality requirement information of the video call service. Details are not described again in this embodiment of this disclosure.

For example, as shown in FIG. 9A, in an implementation of this embodiment, the eNB may send the service establishment response to the IMS device in the following manner:

The eNB may send a create bearer response message to the EPC device (for example, the MME). The create bearer response message carries indication information used to indicate that the eNB can provide radio channel quality corresponding to the radio channel quality requirement information of the video call service.

After receiving the create bearer response, the EPC device may send a credit control request (CCR) message to the PCRF. The CCR message carries indication information used to indicate that the dedicated bearer of the video call service is successfully established.

The PCRF may send an RAR message to the IMS device. The RAR message carries indication information used to indicate that the eNB can provide the radio channel quality corresponding to the radio channel quality requirement information of the video call service.

In addition to the implementation shown in FIG. 9A, the eNB may send the service establishment response to the IMS device through the interface between the eNB and the IMS device. The interface between the IMS device and the eNB is the interface between the service application server and the access network device in the foregoing embodiment. Alternatively, the eNB may add the service establishment response into a user plane data packet, and send the data packet to the IMS device. For a specific method in which the eNB sends the service establishment response to the IMS device through the interface between the eNB and the IMS device or by using the user plane data packet, refer to related descriptions in this embodiment of this disclosure. Details are not described herein again.

Optionally, the eNB may further report, to the IMS device by using the create bearer response message, the CCR message, the RAR message, the interface between the eNB and the IMS device, or the user plane data packet, "at least one of: the radio channel quality of the 4G network cell in which the UE is currently located, the terminal type information of the UE, the carrier information of the 4G cell, the location information of the UE, time information, the load information of the 4G cell, the bandwidth information of the video call service, and the like". As shown in FIG. FIG. 9A, an example in which the create bearer response, the CCR message, and the RAR message carry the RSRP of the cell in which the UE is located is used to describe the following case: The service establishment response carries "at least one of: the radio channel quality of the 4G network cell in which the UE is currently located, the terminal type information of the UE, the carrier information of the 4G cell, the location information of the UE, the time information, the load information of the 4G cell, the bandwidth information of the video call service, and the like".

S906. The IMS device receives the service establishment response sent by the eNB.

S907. The eNB sends a notification message to the IMS device.

The notification message is used to instruct the IMS device to determine updated radio channel quality requirement information of the video call service based on information carried in the notification message. The notification message carries at least one of: the radio channel quality of the 4G network cell in which the UE is located, the terminal type information of the UE, the carrier information of the cell in which the UE is located, the location information of the UE, the load information of the 4G network cell in which the UE is located, the RAT information of the 4G network in which the UE is located, and the bandwidth information of the video call service.

Figure 9B:
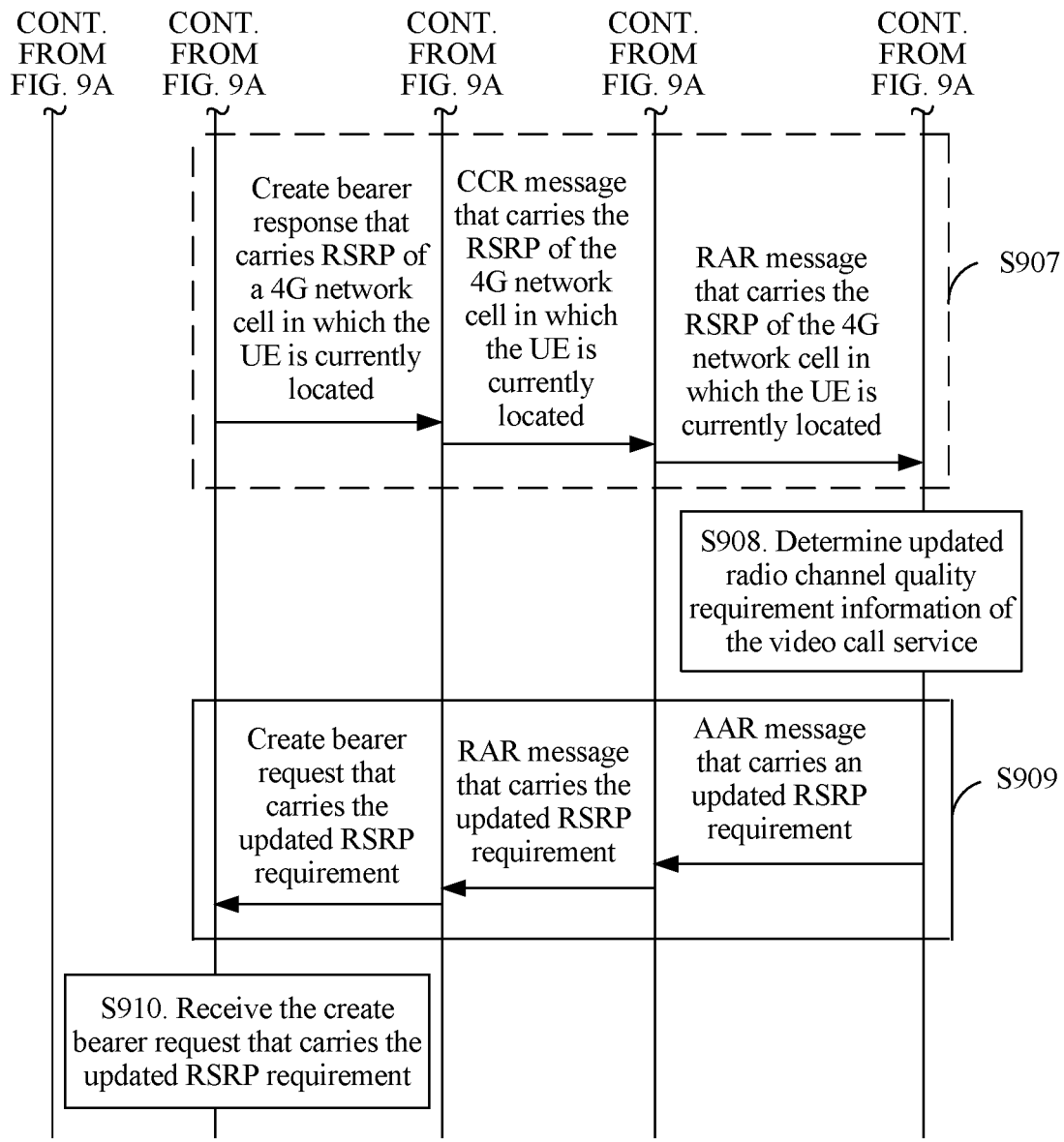

The notification message in this embodiment may be a new message that is temporarily not defined in a standard. Alternatively, as shown in FIG. 9B, for a specific method in which the eNB sends the notification message to the IMS device in S907, refer to the specific method in which the eNB sends the service establishment response to the IMS device in S905 in the foregoing embodiment. Details are not described again in this embodiment of this disclosure.

In addition to the implementation shown in FIG. 9B, the eNB may directly send the notification message to the IMS device through the interface between the eNB and the IMS device. Alternatively, the eNB may send the notification message to the IMS device by using a user plane data packet.

It should be noted that, for a specific method in which the eNB sends the notification message to the IMS device through the interface between the eNB and the IMS device or by using the user plane data packet, refer to the foregoing method in which the eNB sends the service establishment response to the IMS device through the interface between the eNB and the IMS device or by using the user plane data packet. Details are not described again in this embodiment of this disclosure.

S908. The IMS device determines updated radio channel quality requirement information of the video call service based on information carried in the received notification message.

The IMS device may determine the updated radio channel quality requirement information of the video call service based on at least one piece of the following information carried in the notification message: "the radio channel quality of the 4G cell in which the UE is located, the terminal type information of the UE, the carrier information of the cell in which the UE is located, the location information of the UE, the codec information of the video call service, the load information of the 4G cell in which the UE is located, the RAT information of the network of the 4G cell in which the UE is located, and the bandwidth information of the video call service". A method in which the IMS device determines the updated radio channel quality requirement information of the video call service is similar to the method in which the IMS device determines the radio channel quality requirement information of the video call service. Details are not described again in this embodiment of this disclosure.

For example, it is assumed that the radio channel quality requirement information of the video call service includes the codec information of the video call service. The AMR-WB codec is used for the video call service, a codec mode of the AMR-WB codec is 23.85 kbps, and an RSRP requirement of the AMR-WB codec on the 4G cell in which the UE is located is that the RSRP is greater than −115 dBm. However, if the RSRP of the 4G cell in which the UE is located is −118 dBm (which is less than −115 dBm), the IMS device may adjust the codec type of the video service to an EVS codec, adjust the codec mode to 13.2 kbps, and determine, based on the EVS codec type, that an RSRP requirement of the EVS codec on the 4G cell in which the UE is located is that the RSRP is greater than −120 dBm (which is less than −118 dBm).

Optionally, after adjusting the codec information of the video call service, the IMS device may send, to the originating UE and the terminal UE, a notification message used to indicate service codec information adjustment. In addition, if the terminal UE does not support the EVS codec, the IMS device may further perform codec switching between the originating UE and the terminal UE subsequently.

S909. The IMS device sends a service modification request of the video call service to the eNB, where the service modification request carries the updated radio channel quality requirement information of the video call service.

For example, as shown in FIG. 9B, a method in which the IMS device sends the service modification request of the video call service to the eNB is similar to the method in which the IMS device sends the service establishment request of the video call service to the eNB. Details are not described again in this embodiment of this disclosure. In FIG. 9B, an example in which updated RSRP is used as the updated radio channel quality requirement information of the video call service is used.

S910. The eNB receives the service modification request that is of the video call service and that is sent by the IMS device.

As shown in FIG. 9B, that the eNB receives the service modification request sent by the IMS device may be as follows: The eNB receives a create bearer request that carries an updated RSRP requirement.

Further, in this embodiment, after receiving the notification message, the IMS device may further terminate the video call service. When determining that the radio channel quality requirement information of the video call service cannot be further adjusted to enable the radio channel quality of the 4G cell in which the UE is located to meet the radio channel quality requirement corresponding to the radio channel quality requirement information of the video call service, the IMS device may terminate the video call service.

When determining that the video call service is to be terminated, the IMS device may send a service deletion request of the video call service to the originating UE. The service deletion request may carry a cause value of terminating the video call service. For example, the radio channel quality of the 4G cell in which the UE is located cannot meet the radio channel quality requirement corresponding to the radio channel quality requirement information of the video call service.

In an implementation, after receiving the notification message sent by the eNB, if the IMS device determines that the radio channel quality requirement information of the video call service cannot be further adjusted to enable the radio channel quality of the 4G cell in which the UE is located to meet the radio channel quality requirement corresponding to the radio channel quality requirement information of the video call service, the IMS device may negotiate with the originating UE, to query whether the originating UE accepts current service experience and continues to maintain the service. If the UE accepts, the IMS device does not adjust the radio channel quality requirement information of the video call service, and does not perform an operation of terminating the video call service. Instead, the IMS device may re-trigger a dedicated bearer establishment procedure of the video call service to the EPC device and the eNB. In the current dedicated bearer establishment procedure of the video call service, the IMS device does not send the radio channel quality requirement information of the video call service to the EPC device and the eNB, or the IMS device may send the radio channel quality requirement information of the video call service, but instructs the eNB to ignore the radio channel quality requirement information of the video call service when allocating a radio resource to the video call service.

According to the service communication method provided in this embodiment, in the process of establishing the video call service for the UE, the IMS device may deliver the radio channel quality requirement information of the video call service to the eNB, and the eNB may send, to the IMS device, the notification message used by the IMS device to determine the updated radio channel quality requirement information of the video call service, so that the IMS device can correspondingly adjust the radio channel quality requirement information of the video call service to obtain the updated radio channel quality requirement information of the video call service, to complete establishment of the video call service.

It should be noted that, in the foregoing embodiment, the video call service in the 4G network is only used as an example to describe the service communication method provided in this embodiment of this disclosure. The service communication method provided in this embodiment of this disclosure may be further applied to a process of establishing another service in another network standard. In this solution, a network side may update the radio channel quality requirement information of the video call service in real time. Therefore, it can be ensured that after the video call service is created, the video call service can be normally executed and user experience brought by executing the video call service is improved.

It should be noted that, in the foregoing embodiment, the video call service in the 4G network is only used as an example to describe the service communication method provided in this embodiment of this disclosure.

For example, a parameter that affects the radio channel quality requirement information of the video call service includes but is not limited to the radio channel quality (such as the RSRP, the RSRQ, or the SINR) of the 4G network cell in which the UE is located, the location of the UE, the carrier information of the cell in which the UE is located, the time information, the load information of the 4G network cell in which the UE is located, the codec information of the video call service, or the bandwidth information of the video call service. The IMS device may update the radio channel quality requirement information of the VoLTE service in real time based on a change of the foregoing parameter. Certainly, before updating the radio channel quality requirement information of the video call service in real time, the IMS device may obtain, from the UE, the foregoing parameter that affects the radio channel quality requirement information of the video call service.

To adapt to a change of a network user quantity, the IMS device may further deliver, for the video call service, different service requirements to the eNB in different time periods. For example, an RSRP requirement delivered in a busy time (such as daytime in which the user quantity is large) may be −110 dBm, and an RSRP requirement delivered in an idle time (nighttime in which the user quantity is small) may be −120 dBm. When detecting that the foregoing time information changes from the busy time to the idle time, the IMS device may determine that the RSRP requirement may be updated from −110 dBm to −120 dBm.

Alternatively, when the codec information negotiated among the originating UE, the IMS device, and the terminal UE changes, the IMS device may update the radio channel quality requirement information of the video call service to a service requirement corresponding to current codec information.

Alternatively, the IMS device may update the radio channel quality requirement information of the video call service in real time based on a change of the MOS of the video call service. For example, if a current MOS of the video call service is 3.5 and is lower than the preset MOS requirement value 4 of the video call service, the IMS device may update the radio channel quality requirement information of the video call service to a service requirement corresponding to the MOS 3.5.

According to the service communication method provided in this embodiment of this disclosure, the radio channel quality requirement information of the video call service may be updated in real time, to ensure that the video call service is normally executed, thereby ensuring video call quality of the video call service.

The foregoing mainly describes the solutions provided in the embodiments of this disclosure from a perspective of interaction among devices such as the access network device, the service application server, and the core network device. It may be understood that, to implement the foregoing functions, the access network device and the service application server each include a corresponding hardware structure and/or software module for implementing each function. A person skilled in the art should be easily aware that, the access network device, the service application server, and algorithm steps in the examples described with reference to the embodiments disclosed in this specification may be implemented in a form of hardware or in a form of a combination of hardware and computer software in this disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In the embodiments, the access network device and the service application server each may be divided based on the foregoing method examples. For example, each module or unit may be obtained through division for each corresponding function, or two or more functions may be integrated into one processing module. The integrated module may be implemented in a form of hardware, or may be implemented in a form of a software module or unit. Module or unit division in the embodiments of this disclosure is an example, is merely logical function division, and may be another division in actual implementation.

Figure 10:
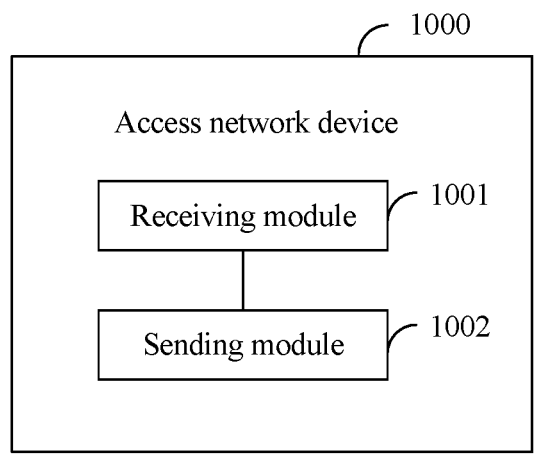
FIG. 10 is a schematic structural composition diagram of an access network device according to an embodiment of this disclosure.

FIG. 10 is a possible schematic structural diagram of the access network device in the foregoing embodiment. The access network device 1000 includes a receiving module 1001 and a sending module 1002. The receiving module 1001 is configured to receive a request message or another type of message that is sent by devices such as a service application server, a core network device, and UE. For example, the receiving module 1001 is configured to support S302 in any one of FIG. 3 to FIG. 8A, S402 in FIG. 4 and FIG. 6B, S703 in FIG. 7, S807 in FIG. 8B, S904 and S910 in FIG. 9A and FIG. 9B, and/or another process of the technology described in this specification. The sending module 1002 is configured to send a response message, a query message, a notification message, or another type of message to devices such as a service application server, a core network device, and UE. For example, the sending module 1002 is configured to support S305 shown in any one of FIG. 3 to FIGS. 4, S905 and S907 in FIG. 9A and FIG. 9B, and/or another process of the technology described in this specification.

Figure 11:
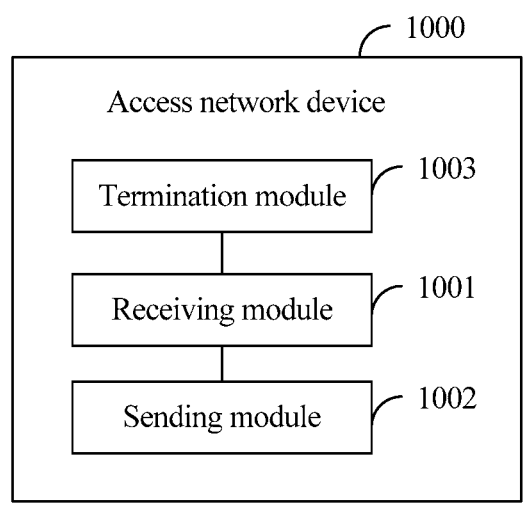
FIG. 11 is a schematic structural composition diagram of another access network device according to an embodiment of this disclosure.

Further, as shown in FIG. 11, the access network device 1000 may further include a termination module 1003. The termination module 1003 is configured to terminate a service after the receiving module 1001 receives a service deletion request. For example, the termination module 1003 is configured to support S704 in FIG. 7 and/or another process of the technology described in this specification.

In addition to the foregoing enumerated modules, the access network device 1000 further includes another module. For example, the access network device 1000 may further include an allocation module configured to allocate a radio resource to the UE, a deletion module configured to delete the radio resource allocated by the allocation module to the UE, and the like. In addition, functions that can be specifically implemented by the modules include but are not limited to functions corresponding to the method steps in the embodiments. For another unit of the access network device 1000 and detailed descriptions of each unit of the access network device 1000, refer to detailed descriptions of a method step corresponding to the unit. Details are not described again in this embodiment of this disclosure.

When an integrated unit is used, the termination module 1003, the allocation module, the deletion module, and the like may be integrated into one processing unit for implementation. The processing unit may be a processor or a controller, for example, may be a CPU, a general purpose processor, a digital signal processor (DSP), an application-specific integrated circuit (ASIC), a field programmable gate array (FPGA) or another programmable logic device, a transistor logic device, a hardware component, or any combination thereof. The processing unit can implement or execute various example logical blocks, modules, and circuits described with reference to the content disclosed in this disclosure. Alternatively, the processing unit may be a combination that implements a computing function, for example, a combination of one or more microprocessors or a combination of a DSP and a microprocessor. The receiving module 1001 and the sending module 1002 may be integrated into one communications unit for implementation, and the communications unit may be a communications interface, a transceiver circuit, a transceiver, or the like.

Figure 12:
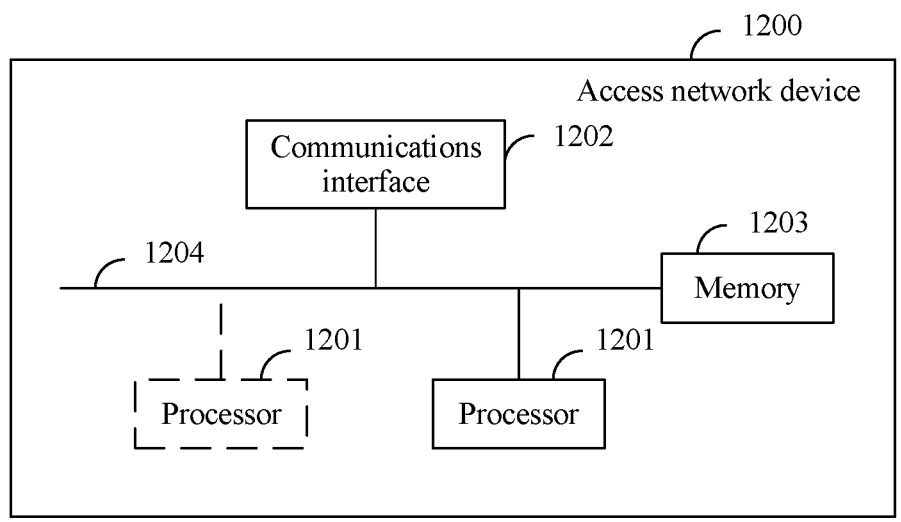
FIG. 12 is a schematic structural composition diagram of another access network device according to an embodiment of this disclosure.

When the processing unit is a processor and the communications unit is a communications interface, the access network device 1000 in this embodiment of this disclosure may be an access network device 1200 shown in FIG. 12. As shown in FIG. 12, the access network device 1200 includes one or more processors 1201, a communications interface 1202, a memory 1203, and a bus 1204. The processor 1201, the communications interface 1202, and the memory 1203 are connected to each other by using the bus 1204. The memory is configured to store one or more application programs. The one or more application programs include an instruction. When the processor 1201 of the access network device 1200 executes the instruction, the access network device 1200 performs the related method steps in any one of FIG. 3 to FIG. 9B, and interacts with a device such as a service application server to implement the service communication method in the foregoing embodiment.

The bus 1204 may be a peripheral component interconnect (PCI) bus, an extended industry standard architecture (EISA) bus, or the like. The bus 1204 may be classified into an address bus, a data bus, a control bus, and the like. For ease of representation, only one thick line is used to represent the bus in FIG. 12, but this does not mean that there is only one bus or only one type of bus.

An embodiment further provides a non-volatile storage medium. The non-volatile storage medium stores one or more program codes. When the processor 1201 of the access network device 1200 executes the program code, the access network device 1200 performs the related method steps in any one of FIG. 3 to FIG. 9B, and interacts with a device such as a service application server to implement the service communication method in the foregoing embodiment.

For detailed descriptions of the units in the access network device provided in this embodiment of this disclosure and technical effects brought after the units or modules perform the related method steps in any one of FIG. 3 to FIG. 9B, refer to related descriptions in the method embodiment of this disclosure. Details are not described herein again.

Figure 13:
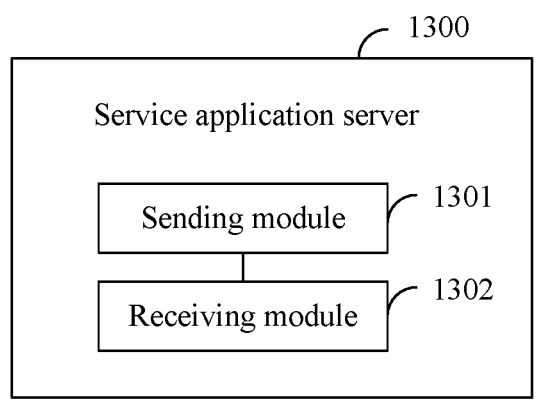
FIG. 13 is a schematic structural composition diagram of a service application server according to an embodiment of this disclosure.

FIG. 13 is a possible schematic structural diagram of the service application server in the foregoing embodiment. The service application server 1300 includes a sending module 1301 and a receiving module 1302. The sending module 1301 is configured to send a request message or another type of message to devices such as an access network device, a core network device, and UE. For example, the sending module 1301 is configured to support S301 in any one of FIG. 3 to FIG. 8A, S401 in any one of FIG. 4 to FIG. 6B, S601 in FIG. 6A, S702 in FIGS. 7, S801 and S806 in FIG. 8A and FIG. 8B, S903 and S909 in FIG. 9A and FIG. 9B, and/or another process of the technology described in this specification. The receiving module 1302 is configured to receive a response message, a query message, or another type of message that is sent by devices such as an access network device, a core network device, and UE. For example, the receiving module 1302 is configured to support S304 in any one of FIG. 3 to FIG. 8A, S605 in FIG. 6B, S805 in FIG. 8B, S906 in FIG. 9A, and/or another process of the technology described in this specification.

Figure 14:
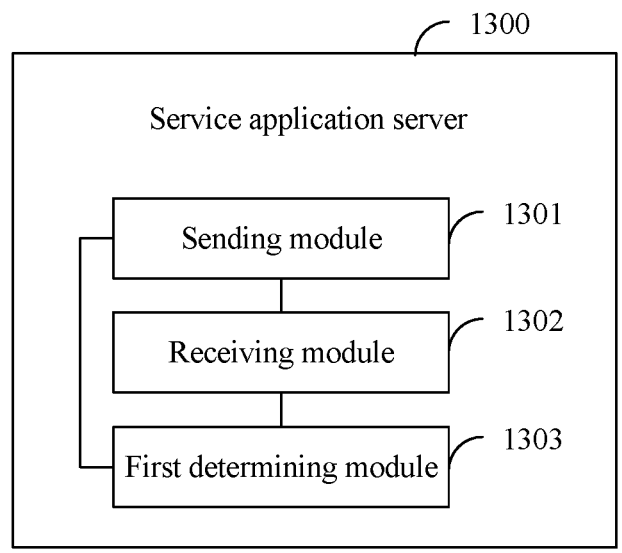
FIG. 14 is a schematic structural composition diagram of another service application server according to an embodiment of this disclosure.

Further, as shown in FIG. 14, the service application server 1300 may further include a first determining module 1303. The first determining module 1303 is configured to determine updated radio channel quality requirement information of a service based on information carried in a notification message received by the receiving module. For example, the first determining module 1303 is configured to support S305 in FIG. 3 and FIG. 4, S501 in FIG. 5, and/or another process of the technology described in this specification. Certainly, the receiving module 1302 may be further configured to receive related information used by the first determining module 1303 to determine radio channel quality requirement information of the service or the updated radio channel quality requirement information of the service.

Figure 15:
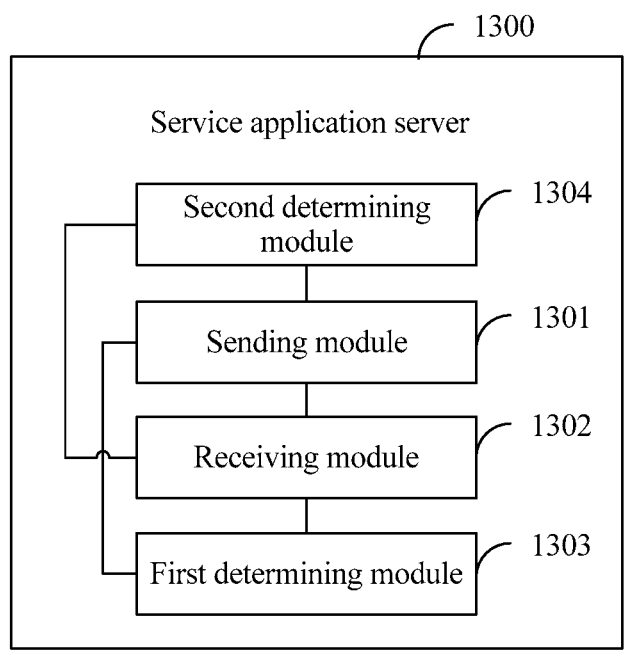
FIG. 15 is a schematic structural composition diagram of another service application server according to an embodiment of this disclosure.

Further, as shown in FIG. 15, the service application server 1300 may further include a second determining module 1304. The second determining module 1304 is configured to determine, based on a mean opinion score MOS requirement of the service and the information carried in the notification message received by the receiving module 1302, that the service is to be terminated. For example, the second determining module 1304 is configured to support S701 in FIG. 7 and/or another process of the technology described in this specification.

Certainly, in addition to the foregoing enumerated modules, the service application server 1300 further includes another module. For example, the service application server 1300 may further include a switching module configured to perform codec information switching. In addition, functions that can be specifically implemented by the modules include but are not limited to functions corresponding to the method steps in the embodiments. For another unit of the service application server 1300 and detailed descriptions of each unit of the service application server 1300, refer to detailed descriptions of a method step corresponding to the unit. Details are not described again in this embodiment of this disclosure.

When an integrated unit is used, modules such as the first determining module 1303, the second determining module 1304, and the switching module may be integrated into one processing unit for implementation. The processing unit may be a processor or a controller, for example, may be a CPU, a general purpose processor, a DSP, an ASIC, an FPGA or another programmable logic device, a transistor logic device, a hardware component, or any combination thereof. The processing unit can implement or execute various example logical blocks, modules, and circuits described with reference to the content disclosed in this disclosure. Alternatively, the processing unit may be a combination that implements a computing function, for example, a combination of one or more microprocessors or a combination of a DSP and a microprocessor. The sending module 1301 and the receiving module 1302 may be integrated into one communications unit for implementation, and the communications unit may be a communications interface, a transceiver circuit, a transceiver, or the like.

Figure 16:
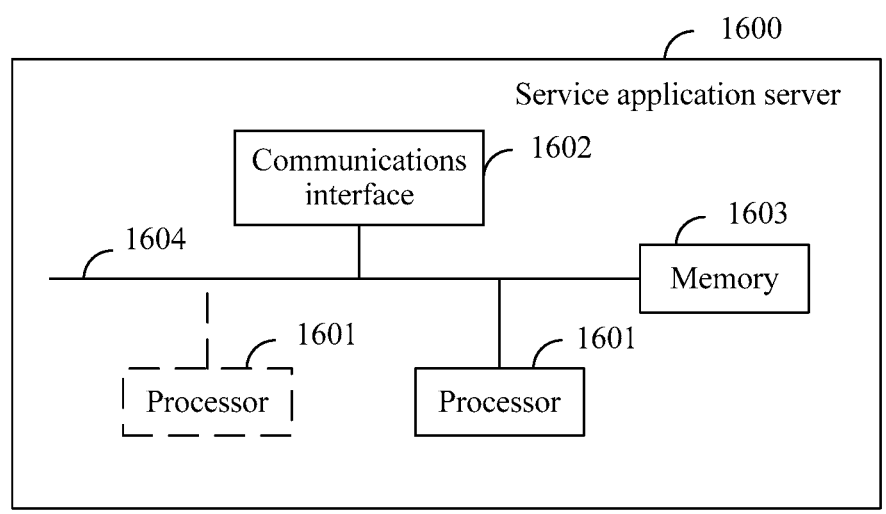
FIG. 16 is a schematic structural composition diagram of another service application server according to an embodiment of this disclosure.

When the processing unit is a processor and the communications unit is a communications interface, the service application server 1300 in this embodiment of this disclosure may be a service application server 1600 shown in FIG. 16. As shown in FIG. 16, the service application server 1600 includes one or more processors 1601, a communications interface 1602, a memory 1603, and a bus 1604. The processor 1601, the communications interface 1602, and the memory 1603 are connected to each other by using the bus 1604. The memory is configured to store one or more application programs. The one or more application programs include an instruction. When the processor 1601 of the service application server 1600 executes the instruction, the service application server 1600 performs the related method steps in any one of FIG. 3 to FIG. 9B, and interacts with a device such as a service application server to implement the service communication method in the foregoing embodiment.

The bus 1604 may be a PCI bus, an EISA bus, or the like. The bus 1604 may be classified into an address bus, a data bus, a control bus, and the like. For ease of representation, only one thick line is used to represent the bus in FIG. 16, but this does not mean that there is only one bus or only one type of bus.

An embodiment of this disclosure further provides a non-volatile storage medium. The non-volatile storage medium stores one or more program codes. When the processor 1601 of the service application server 1600 executes the program code, the service application server 1600 performs the related method steps in any one of FIG. 3 to FIG. 9B, and interacts with a device such as a service application server to implement the service communication method in the foregoing embodiment.

For detailed descriptions of the units or modules in the service application server provided in this embodiment of this disclosure and technical effects brought after the units or modules perform the related method steps in any one of FIG.

3 to FIG. 9B, refer to related descriptions in the method embodiment of this disclosure. Details are not described herein again.

Based on the descriptions of the foregoing implementations, a person skilled in the art may clearly understand that, for the purpose of convenient and brief description, division of the foregoing modules is only used as an example for description. In actual application, the foregoing functions can be allocated to different modules and implemented as required, that is, an inner structure of an apparatus is divided into different modules to implement all or some of the functions described above. For a detailed working process of the foregoing system, apparatus, and unit, refer to a corresponding process in the foregoing method embodiments. Details are not described herein again.

In the several embodiments provided in this disclosure, it should be understood that, the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, units in the embodiments of this disclosure may be integrated into one processing unit, or each of the units may exist alone physically, or two or more units may be integrated into one unit. The integrated unit may be implemented in a form of hardware, or may be implemented in a form of a software unit.

When the integrated unit is implemented in the form of the software unit and sold or used as an independent product, the integrated unit may be stored in a computer readable storage medium. Based on such an understanding, the technical solutions of this disclosure essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor to perform all or some steps of the methods in the embodiments of this disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A service communication method, comprising:
   receiving, by an access network device, a service establishment request sent by a service application server, wherein the service establishment request carries radio channel quality requirement information of a service, wherein the radio channel quality requirement information of the service indicates, to the access network device, a radio channel quality requirement for executing the service by user equipment (UE); and
   sending, by the access network device, a notification message to the service application server, wherein the notification message carries information reflecting an actual network status of a cell in which the UE is located, wherein the actual network status of the cell in which the UE is located is used by the service application server to determine updated radio channel quality requirement information.

2. The method according to claim 1, wherein the information that is carried in the notification message and that reflects the actual network status of the cell in which the UE is located comprises at least one of:
   terminal type information of the UE, carrier information of the cell in which the UE is located, location information of the UE, load information of the cell in which the UE is located, radio access technology (RAT) information of a network of the cell in which the UE is located, recommended-codec information, or bandwidth information of the service.

3. The method according to claim 1, wherein the radio channel quality requirement information comprises at least one of:
   terminal type information of the UE, service type indication information of the service, codec information of the service, or a codec information list of the UE, wherein the terminal type information of the UE, or the codec information list of the UE comprises codec information supported by both the UE and the service application server.

4. The method according to claim 1, wherein before sending, by the access network device, the notification message to the service application server, the method further comprises:
   sending, by the access network device, a measurement control command to the UE; and
   receiving, by the access network device, a measurement report sent by the UE, wherein the measurement report carries radio channel quality of the cell in which the UE is located.

5. The method according to claim 1, wherein after the sending, by the access network device, a notification message to the service application server, the method further comprises:
   receiving, by the access network device, a service modification request sent by the service application server, wherein the service modification request carries the updated radio channel quality requirement information, wherein the updated radio channel quality requirement information comprises at least one of:
   terminal type information of the UE, updated service type indication information of the service, updated codec information of the service, or a codec information list of the UE, wherein the terminal type information of the UE, and the codec information list of the UE comprises codec information supported by both the UE and the service application server.

6. The method according to claim 1, wherein the notification message is transmitted by using an Internet Protocol (IP) data packet, a User Datagram Protocol (UDP) data packet, or a Real-Time Transport Protocol (RTP) data packet of the service.

7. An access network device, comprising:
a communications interface, configured to receive a service establishment request sent by a service application server, wherein the service establishment request carries radio channel quality requirement information of a service, wherein the radio channel quality requirement information of the service indicates, to the access network device, a radio channel quality requirement for executing the service by user equipment (UE); and
a processor, configured to determine information reflecting an actual network status of a cell in which the UE is located, wherein the actual network status of the cell in which the UE is located is used by the service application server to determine updated radio channel quality requirement information,
wherein the communications interface is further configured to send a notification message to the service application server, wherein the notification message carries the information that is determined by the processor and that reflects the actual network status of the cell in which the UE is located.

8. The access network device according to claim 7, wherein the information that is carried in the notification message sent by the communications interface and that reflects the actual network status of the cell in which the UE is located comprises at least one of:
terminal type information of the UE, carrier information of the cell in which the UE is located, location information of the UE, load information of the cell in which the UE is located, radio access technology (RAT) information of a network of the cell in which the UE is located, recommended-codec information, or bandwidth information of the service.

9. The access network device according to claim 7, wherein the communications interface is further configured to:
before sending the notification message to the service application server, send a measurement control command to the UE; and the communications interface is further configured to receive a measurement report sent by the UE, wherein the measurement report carries radio channel quality of the cell in which the UE is located.

10. The access network device according to claim 7, wherein the communications interface is further configured to:
after sending the notification message to the service application server, receive a service modification request sent by the service application server, wherein the service modification request carries the updated radio channel quality requirement information, wherein the updated radio channel quality requirement information comprises at least one of:
terminal type information of the UE, updated service type indication information of the service, an updated radio channel quality requirement of the service, updated codec information of the service, or a codec information list of the UE, wherein the terminal type information of the UE, and the codec information list of the UE comprises codec information supported by both the UE and the service application server.

11. The access network device according to claim 7, wherein the notification message sent by the communications interface is transmitted by using an Internet Protocol (IP) data packet, a User Datagram Protocol (UDP) data packet, or a Real-Time Transport Protocol (RTP) data packet of the service.

12. A service application server, comprising:
a communications interface, configured to:
send a service establishment request to an access network device, wherein the service establishment request carries radio channel quality requirement information of a service, wherein the radio channel quality requirement information of the service indicates, to the access network device, a radio channel quality requirement for executing the service by user equipment (UE); and
receive a notification message sent by the access network device, wherein the notification message carries information reflecting an actual network status of a cell in which the UE is located, wherein the actual network status of the cell in which the UE is located is used by the service application server to determine updated radio channel quality requirement information; and
a processor, configured to determine the updated radio channel quality requirement information based on the information that is carried in the notification message received by the communications interface and that reflects the actual network status of the cell in which the UE is located.

13. The service application server according to claim 12, wherein the information that is carried in the notification message received by the communications interface and that reflects the actual network status of the cell in which the UE is located comprises at least one of:
terminal type information of the UE, carrier information of the cell in which the UE is located, location information of the UE, load information of the cell in which the UE is located, radio access technology (RAT) information of a network of the cell in which the UE is located, recommended-codec information, or bandwidth information of the service.

14. The service application server according to claim 13, wherein the processor is configured to determine the updated radio channel quality requirement information based on a mean opinion score (MOS) requirement of the service and at least one piece of the following information carried in the notification message received by the communications interface:
radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which the UE is located, or the bandwidth information of the service; or
the communications interface is further configured to send a first query request to a third-party network device, wherein the first query request carries an MOS requirement of the service and at least one of: radio channel quality of the cell in which the UE is located, the terminal type information of the UE, the carrier information of the cell in which the UE is located, the location information of the UE, the codec information of the service, the load information of the cell in which the UE is located, the RAT information of the network of the cell in which the UE is located, or the bandwidth information of the service; and the communications interface is further configured to receive a first query response sent by the third-party network device, wherein the first query response carries the updated radio channel quality requirement information.

15. The service application server according to claim 14, wherein the communications interface is further configured to send a service modification request to the access network device after the processor determines the updated radio channel quality requirement information or after the communications interface receives the first query response sent by the third-party network device, wherein the service modification request carries the updated radio channel quality requirement information, wherein the updated radio channel quality requirement information comprises at least one of:

terminal type information of the UE, updated service type indication information of the service, an updated radio channel quality requirement of the service, updated codec information of the service, or a codec information list of the UE, wherein the terminal type information of the UE, and the codec information list of the UE comprises codec information supported by both the UE and the service application server.

16. The service application server according to claim 12, wherein the notification message received by the communications interface is transmitted by using an Internet Protocol (IP) data packet, a User Datagram Protocol (UDP) data packet, or a Real-Time Transport Protocol (RTP) data packet of the service.

\* \* \* \* \*